(12) United States Patent
Okunishi et al.

(10) Patent No.: US 7,916,069 B2
(45) Date of Patent: Mar. 29, 2011

(54) RADAR DEVICE

(75) Inventors: Akira Okunishi, Nishinomiya (JP);
Masahiro Nakahama, Nishinomiya (JP); Masashi Ohhora, Nishinomiya (JP)

(73) Assignee: Furuno Electric Co., Ltd., Hyogo (JP)

( * ) Notice: Subject to any disclaimer, the term of this patent is extended or adjusted under 35 U.S.C. 154(b) by 35 days.

(21) Appl. No.: 12/230,409

(22) Filed: Aug. 28, 2008

(65) Prior Publication Data
US 2009/0058713 A1  Mar. 5, 2009

(30) Foreign Application Priority Data

Aug. 31, 2007  (JP) ................................ 2007-225955
Oct. 23, 2007  (JP) ................................ 2007-275645

(51) Int. Cl.
*G01S 13/00*  (2006.01)
(52) U.S. Cl. .................... 342/175; 342/190; 342/191
(58) Field of Classification Search .............. 342/70
See application file for complete search history.

(56) References Cited

U.S. PATENT DOCUMENTS

| | | | |
|---|---|---|---|
| 5,016,017 A * | 5/1991 | Kodera et al. | 342/106 |
| 5,337,055 A | 8/1994 | Ghignoni | |
| 6,717,545 B2 | 4/2004 | Dizaji et al. | |
| 6,868,044 B1 | 3/2005 | Barnard | |
| 7,444,157 B2 * | 10/2008 | Hovers et al. | 455/562.1 |
| 2003/0174088 A1 * | 9/2003 | Dizaji et al. | 342/93 |
| 2008/0106460 A1 * | 5/2008 | Kurtz et al. | 342/99 |

FOREIGN PATENT DOCUMENTS

| | | |
|---|---|---|
| JP | 62-157584 | 7/1987 |
| JP | 3-20714 B2 | 3/1991 |
| JP | 5-59387 B2 | 8/1993 |
| JP | 7-20227 | 1/1995 |
| JP | 11-287851 A | 10/1999 |
| JP | 2002-243842 A | 8/2002 |
| JP | 3725669 B2 | 9/2005 |

* cited by examiner

*Primary Examiner* — Thomas H Tarcza
*Assistant Examiner* — Timothy A Brainard
(74) *Attorney, Agent, or Firm* — Birch, Stewart, Kolasch and Birch, LLP

(57) ABSTRACT

A radar device is provided in this disclosure. The radar device includes an area determination module for performing a determination of a noise superior area or a target-echo superior area for each divided area of a radar-search area defined in advance, a noise-level calculation module for calculating a noise level for a divided area based on received signals from the divided area that is determined as the noise superior area, and an interpolation module for interpolating or extrapolating the calculated noise level for the divided area that is determined as the noise superior area, to obtain a noise level for a divided area that is determined as the target-echo superior area.

20 Claims, 22 Drawing Sheets

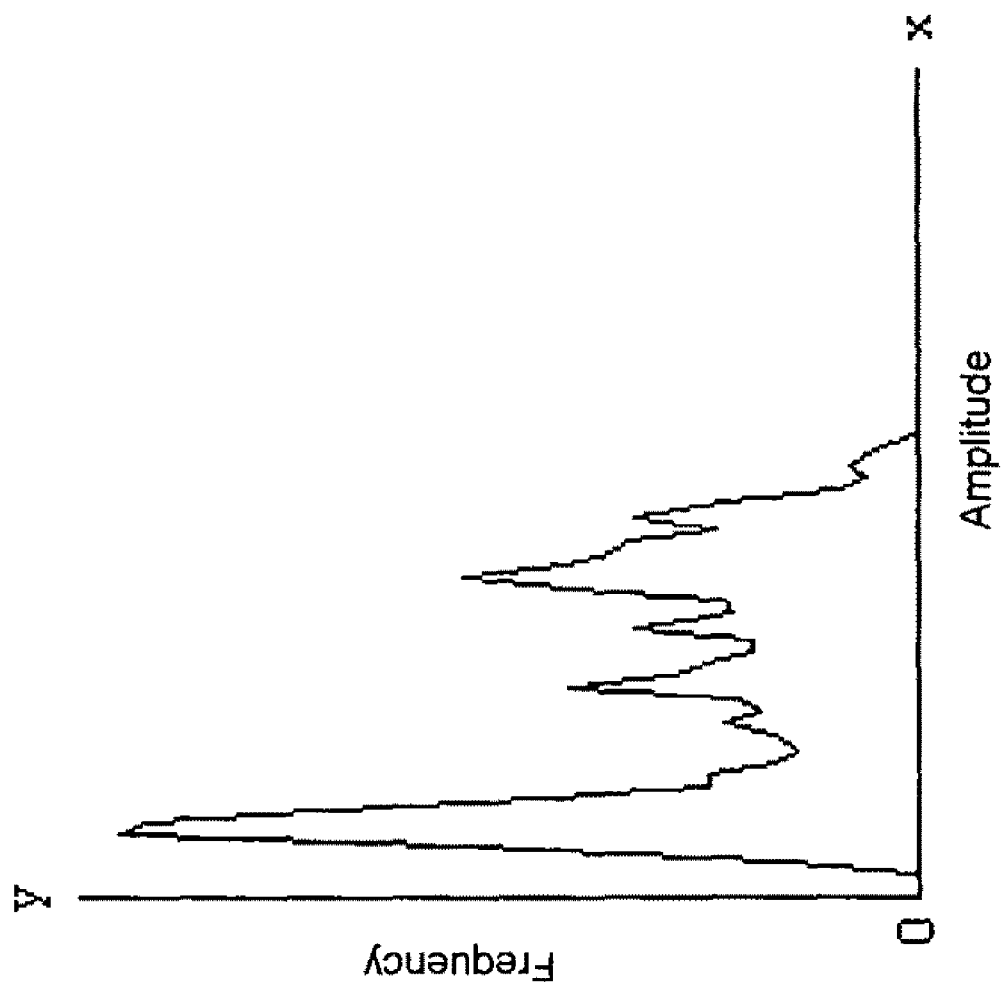

RADAR DEVICE

CROSS-REFERENCE TO RELATED APPLICATION(S)

This application claims priority under 35 U.S.C. §119 to Japanese Patent Application No. 2007-225955, which was filed on Aug. 31, 2007, and Japanese Patent Application No. 2007-275645, which was filed on Oct. 23, 2007, the entire disclosures of which are hereby incorporated by reference.

TECHNICAL FIELD

The present invention relates to a radar device for transmitting and receiving pulse signals, and particularly, to a radar device that obtains the noise-level distribution for a radar-search area using amplitude information on the received signals acquired for the radar-search area.

BACKGROUND

Radar devices are equipped on a marine vessel to assist safe and efficient voyages. In order to obtain the optimum radar image, it is necessary to appropriately adjust receiving sensitivity to remove white noise caused inside a radar receiver or clutters including sea-surface reflections, and rain-and-snow reflections at the optimum level. The adjustment of the receiving sensitivity typically is performed by using a gain control device in the radar receiver. In this disclosure, unnecessary signals, such as white noise and clutters are referred to as "noises," and reflected signals from an object to be detected, such as a ship or a buoy, are referred to as "target object echoes," to herein distinguish these from the noises.

One of the receiving sensitivity adjustment techniques for the conventional radar devices is disclosed in Japanese Patent No. 3288489, for example. This adjustment technique extracts signals necessary to perform the sensitivity adjustment from the received signals, and counts the number of the extracted signals. Then, the count is compared with a predetermined reference, and a level for gain control signals is adjusted according to the comparison.

The unnecessary signals, such as clutters less likely occur continuously between a present radar image and a past radar image. Thus, the unnecessary signals, such as clutters generated at random are removed based on the correlation of the present radar image and the past radar image to display only echoes from a target object.

However, the levels of white noise may differ depending on radar receivers, and may also vary according to external environmental conditions, such as temperature. The level of clutters due to the sea-surface reflections and the rain-and-snow reflections varies over time, according to oceanic conditions and climates. Therefore, the technique disclosed in Japanese Patent No. 3288489 that compares the count with the predetermined reference value is problematic because it cannot follow the variation in the noise level, as described above.

In addition, because Japanese Patent No. 3288489 counts the signals extracted from the received signals, if necessary signals for performing the sensitivity adjustment are not well extracted, the receiving sensitivity adjustment cannot be appropriately performed due to influence of other signals. For example, when white noise or clutters are intended to be removed, but the extracted signals includes interference waves from other radars or target object echoes, a receiving sensitivity will be lowered more than necessary due to influence of the signal at a strong level. Therefore, there is a problem in which weak target object echoes are not displayed in a display screen.

In order to assist safe cruise in ocean areas, such as areas in proximity to or in harbors, canals or the like where many artificial structures, such as quays, breakwaters, piers, and other vessels exist (hereinafter, these ocean areas are referred to as "port areas"), the radar device is desirable to clearly display artificial structures which exist in proximity to the equipped ship, such as quays, breakwaters, piers, and other ships.

However, the receiving sensitivity that is suitable for removing the noises on the ocean area distant from land and the receiving sensitivity that is suitable for clearly displaying the artificial structures for the port area are not necessarily identical. Therefore, even if the noises on the ocean area are appropriately removable by the conventional automatic gain control disclosed in Japanese Patent No. 3288489, clearly displaying the artificial structures in the port area may be difficult with the same receiving sensitivity.

To remove the unnecessary signals, such as clutters, by performing the correlation process, it is necessary to optimize weights of the present radar image and the past radar image so that only the echoes from target object which is necessary, while removing unnecessary signals, such as clutters are displayed. However, the levels of clutters of the sea-surface reflections and the rain-and-snow reflections vary over time in accordance with oceanic conditions or climates. That is, the levels of clutters may vary even in the same radar-search area. Therefore, the conventional radar device is difficult to perform the correlation process with the optimum weights.

SUMMARY

The present invention addresses the above conditions, and provides an improved radar device.

According to an aspect of the present invention, a radar device includes an area determination module for performing a determination of a noise superior area or a target-echo superior area for each divided area of a radar-search area defined in advance, a noise-level calculation module for calculating a noise level for a divided area based on received signals from the divided area that is determined as the noise superior area, and an interpolation module for interpolating or extrapolating the calculated noise level for the divided area that is determined as the noise superior area, to obtain a noise level for a divided area that is determined as the target-echo superior area.

The area determination module may perform the determination of the noise superior area or the target-echo superior area for each divided area based on a frequency-of-appearance distribution (frequency distribution) of amplitudes of the received signals as a variable for the divided area.

The area determination module may perform the determination of the noise superior area or the target-echo superior area by evaluating symmetry of the frequency-of-appearance distribution.

The area determination module may perform the determination of the noise superior area or the target-echo superior area based on the frequency of appearance greater than a predetermined value.

The area determination module may perform the determination of the noise superior area or the target-echo superior area based on a signal amplitude corresponding to the maximum frequency of appearance, and a signal amplitude corresponding to N % frequency of appearance of the maximum frequency of appearance (0<N<100).

The area determination module may perform the determination of the noise superior area or the target-echo superior area based on a signal amplitude corresponding to N % frequency of appearance of the maximum frequency of appearance (0<N<100), and a signal amplitude corresponding to M % frequency of appearance of the maximum frequency of appearance (0<M<100, M≠N).

The noise level for the divided area calculated by the noise-level calculation module may be a noise level at a predetermined location in the divided area that is determined as the noise superior area. In addition, the interpolation module may interpolate or extrapolate a noise level for the predetermined location in an azimuthal direction or a distance direction to obtain a noise-level distribution for the radar-search area.

The radar device may further include a gain control module for comparing amplitudes of the received signals acquired for the radar-search area with a predetermined threshold to output received signals with the amplitudes greater than the predetermined threshold. The gain control module may determine the predetermined threshold based on the noise-level distribution for the radar-search area generated by the interpolation module to perform a gain control of the received signals.

The radar device may further include a correlation module for performing a correlation process of a present radar image and a past radar image. The gain control module may change the predetermined threshold for a comparison with the amplitudes of the received signals between a case where the correlation process is performed by the correlation module and a case where it is not performed.

Also, the correlation module may determine weights of the present radar image and the past radar image based on the noise-level distribution generated by the interpolation module, and perform the correlation process of the present radar image and the past radar image based on the determined weights.

The radar device may be equipped on a marine vessel.

The radar device may further include an inside-or-outside-the-port determination module for determining whether such an equipped ship is located inside a port area or outside the port area, and a noise-level-distribution generation module including a first noise-level-distribution generation module and a second noise-level-distribution generation module, the first noise-level-distribution generation module having the area determination module, the noise-level calculation module, and the interpolation module, the second noise-level-distribution generation module generating a noise-level distribution for the radar-search area with a different algorithm from an algorithm used by the first noise-level-distribution generation module, and the noise-level-distribution generation module outputting a noise-level distribution. The noise-level-distribution generation module may output a noise-level distribution for outside the port area generated by the first noise-level-distribution generation module when the equipped ship is located outside the port area, and output a noise-level distribution for inside the port area generated by the second noise-level-distribution generation module when the equipped ship is located inside the port area.

The inside-or-outside-the-port determination module may determine whether the equipped ship is located inside the port area or outside the port area based on the amplitudes of the received signals in a port determining area defined as an area of a predetermined distance range from the equipped ship.

The inside-or-outside-the-port determination module may count the number of data (Nnum) that has amplitudes greater than a predetermined amplitude (Aref) based on the received signals of the port determining area. The inside-or-outside-the-port determination module may determine that the equipped ship is located inside the port area when the count (Nnum) is greater than a predetermined value (Nref), and determines that the equipped ship is located outside the port area when less than the predetermined value (Nref).

The inside-or-outside-the-port determination module may determine that the equipped ship is located inside the port area or outside the port area based on amplitudes of the received signals extracted for each of first divided port determining areas defined as one of a plurality of areas into which the port determining area is divided in the azimuthal direction.

The inside-or-outside-the-port determination module may determine whether the equipped ship is located inside the port area or outside the port area based on equipped ship location information and map information.

The inside-or-outside-the-port determination module may perform the determination of inside the port area or outside the port area for each of second divided port determining areas defined as one of a plurality of areas into which the radar-search area is divided in the azimuthal direction. The noise-level-distribution generation module may select a noise-level distribution to output for each of the second divided port determining areas.

Immediately after the determination result by the inside-or-outside-the-port determination module changes from inside the port area to outside the port area, or immediately after changing from outside the port area to inside the port area, the noise-level-distribution generation module may cause the first noise-level-distribution generation module and the second noise-level-distribution generation module to generate both a noise-level distribution for outside the port area and a noise-level distribution for inside the port area, respectively. The noise-level-distribution generation module may output a weighted average of both as the noise-level distribution to be generated.

The noise-level-distribution generation module may output a weighted average of a previously outputted noise level and a presently calculated noise level as the noise-level distribution to presently output.

The radar device may further include an informing module for informing a user whether the equipped ship is located inside the port area or outside the port area based on the determination result of the inside-or-outside-the-port determination module.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 6A-6C are views showing frequency-of-appearance distributions of an area where clutters, white noise, and target object echoes are superior than the others, respectively;

DETAILED DESCRIPTION OF THE PREFERRED EMBODIMENT

Generally, a radar device for a marine vessel transmits pulse-like electric waves at a predetermined cycle from an antenna that rotates in a horizontal plane at a predetermined cycle, and receives electric waves reflected from target objects. A receiving module of the radar device performs sampling at a predetermined sampling rate by converting the received electric waves into electric signals to convert them into digital signals. Here, the received data contains signals reflected from the target objects, as well as noises, such as white noise and clutters. For this reason, the general radar device typically performs a gain control of the received signals so that it compares amplitudes of the received signals acquired for a radar-search area with a predetermined threshold, and outputs received signals that has greater amplitudes than the predetermined threshold.

In the following, various radar devices applicable to the present invention will be described referring to the appending drawings; however, the radar devices may be applicable to any type of vehicles capable of transmitting/receiving electric waves on water surface, other than the marine vessels as described above.

Embodiment 1

Figure 1:
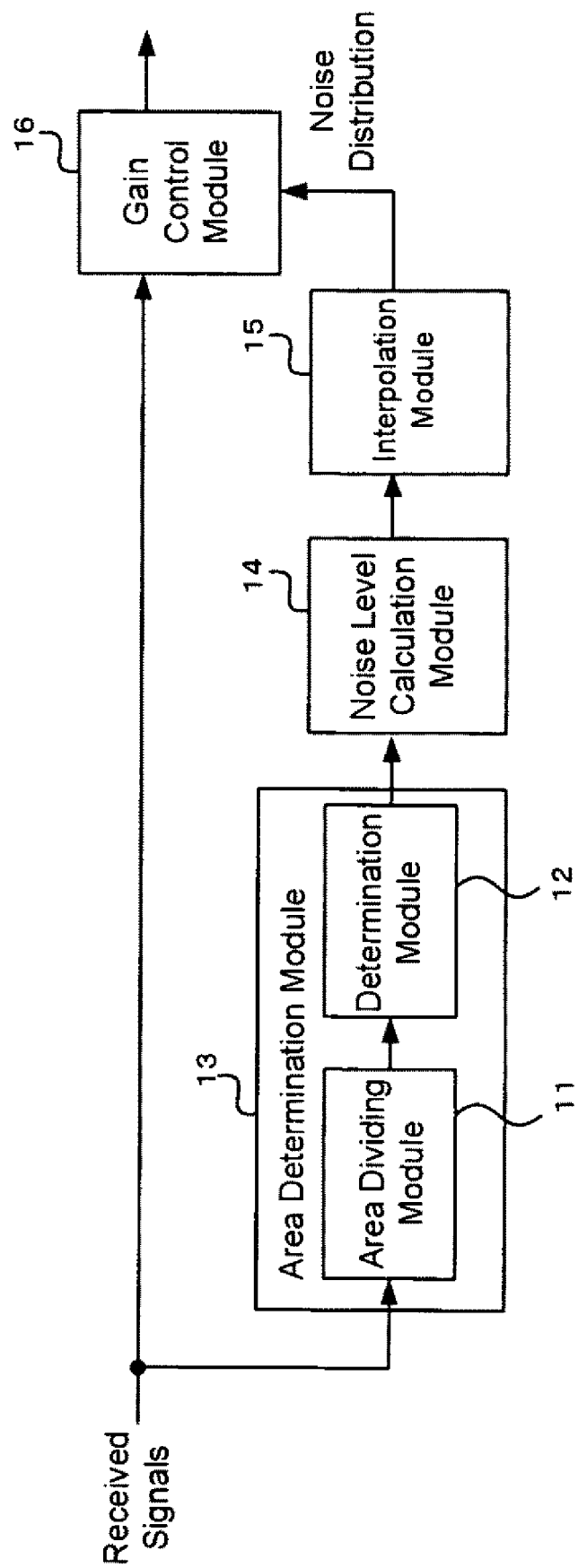
FIG. 1 is a block diagram illustrating an automatic gain control process by a radar device according to the present invention.

FIG. 1 is a block diagram illustrating an automatic gain control process performed by a radar device according to an embodiment of the present invention. As shown in FIG. 1, the radar device of this embodiment includes an area determination module 13 having an area dividing module 11 and a determination module 12, a noises-level calculation module 14, an interpolation module 15, and a gain control module 16.

The area determination module 13 determines whether each of a plurality of divided areas defined by dividing a radar search area is either "a noise superior area" where noises, such as white noise and clutters are dominant, or "a target-echo superior area" where target object echoes are dominant.

More specifically, the area dividing module 11 of the area determination module 13 extracts the received signals for each of the plurality of divided areas defined by dividing the entire search area.

Figure 2:
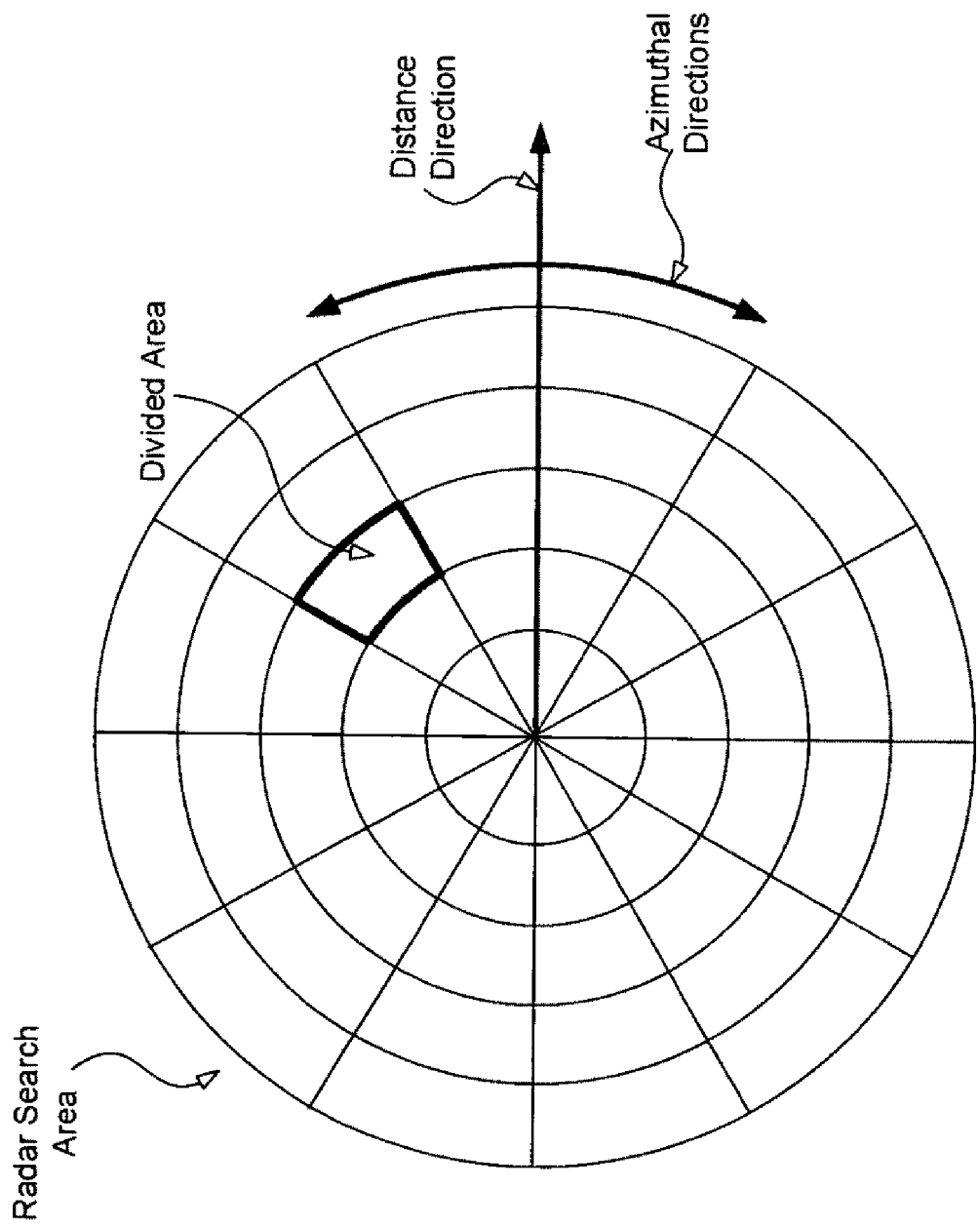
FIG. 2 is a view showing an example of a divided area.

FIG. 2 is a view showing an example of the divided areas. In FIG. 2, an outward radial direction indicates "distance," and circumferential directions indicate azimuthal directions.

The outermost circle of FIG. 2 shows a perimeter of the radar-search area. As shown in FIG. 2, the entire radar-search area is divided into the plurality of radar-search areas in the distance direction and the azimuthal direction. Each of the divided areas is herein defined and used as a determination unit whether the divided area is the "noise superior area" or the "target-echo superior area," as described above. In the example shown in FIG. 2, the entire radar-search area is divided into five areas in the distance direction and into twelve areas in the azimuthal direction. This division is merely an example, and the number of divisions may be arbitrary set. In addition, widths of each divided area in the distance direction or in the azimuthal direction may be different from the other divided areas. In addition, the coordinate of the central point may be arbitrarily set. In addition, the division may be made according to the size of the entire search area. Further, the entire search area is not necessary to be divided, and for example, only an area in proximity to an equipped ship may be divided.

As used herein, the term "equipped ship" may be, but not limited to, any vessel that is equipped with device(s) to transmit and/or receive the radar signals or electrical waves, and the device(s) for the transmission/reception may be located remote from the vessel.

The determination module 12 determines for each divided area whether the divided area is the noise superior area or the target-echo superior area.

In this embodiment, the automatic gain control process of the radar device requires a determination of an appropriate threshold for separating the target object echoes from noises. However, the radar received signals typically include white noise, clutters, and target object echoes at a various rate and, thus, it may be difficult to determine the appropriate threshold for an area where noises, such as white noise and clutters, and target object echoes are intermingled. For this reason, in this embodiment, the received signals are extracted for each divided area, and the determination whether each divided area is the noise superior area or the target-echo superior area is performed.

The determination by the determination module 12 of the noise superior area or the target-echo superior area can be performed by evaluating a frequency-of-appearance distribution for each divided area by utilizing that frequency-of-appearance distributions for amplitudes of the received signals as a variable differ between the noise superior area and the target-echo superior area. Specifically, the determination may be performed by evaluating symmetry of the frequency-of-appearance distributions. Alternatively, it may also be possible to use skewness, kurtosis, etc. of the frequency-of-appearance distributions for the evaluation. The determination will be further illustrated with more concrete examples.

There is no restriction in particular for the sample number of the received signal data to be used for generating the frequency-of-appearance distributions for each divided area. However, it may be necessary to secure the sample number with which features of the frequency-of-appearance distributions of each divided area appear clearly and stably. For example, it may be preferred to secure the sample number of 1000 or more for each divided area.

Figure 3:
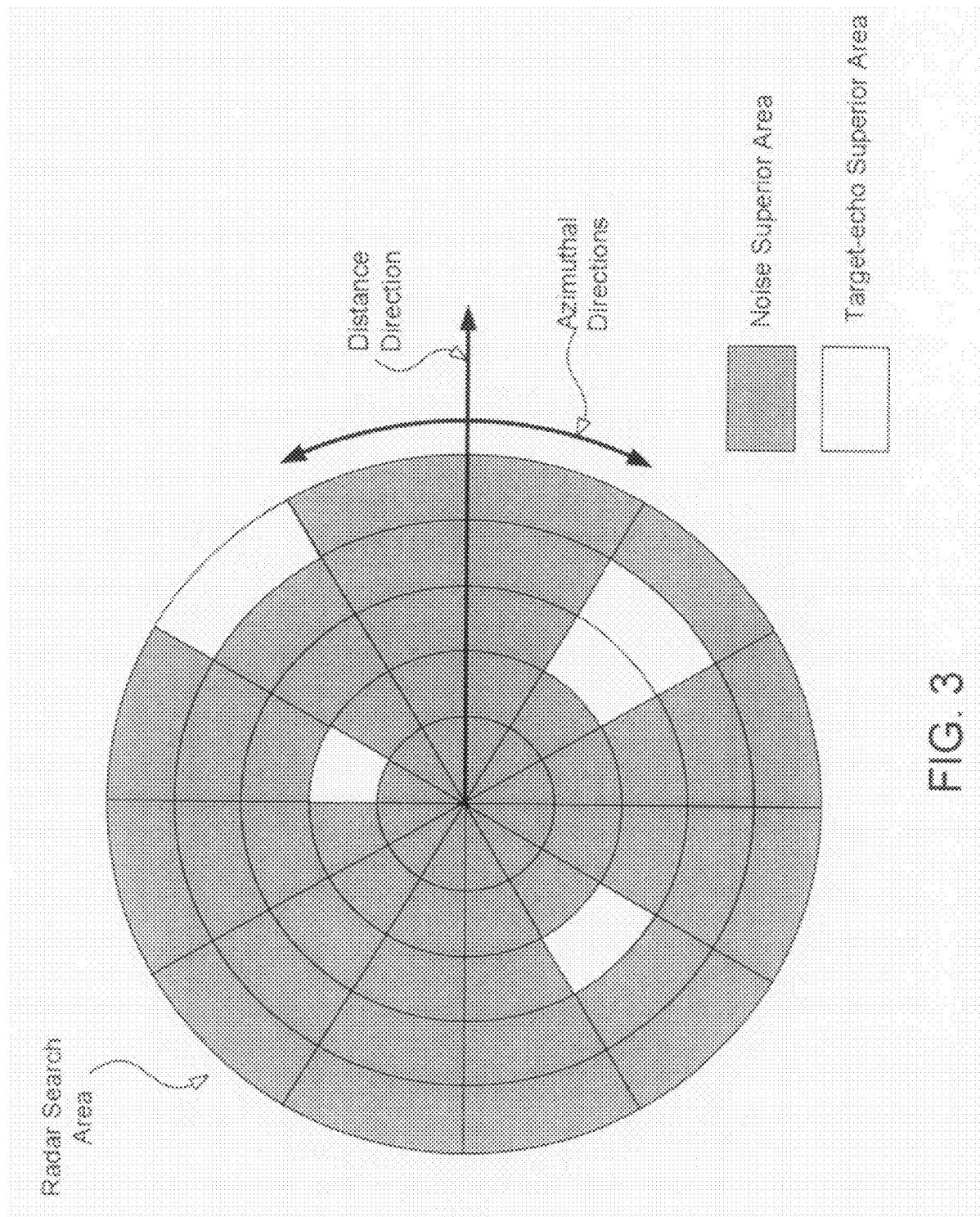
FIG. 3 is a view showing an example of a determination result by an area determination module of the radar device according to the invention.

FIG. 3 shows an example of the determination result by the area determination module 13. In FIG. 3, gray portions indicate the noise superior areas, and white portions indicate the target-echo superior area. The area determination module 13 determines whether the area is a noise superior area or a target-echo superior area for each divided area, and then outputs the determination result to the noise-level calculation module 14.

The noise-level calculation module 14 calculates a noise level for a divided area that is determined by the area determination module 13 as a noise superior area. That is, the calculation of the noise level by the noise-level calculation module 14 is performed based on the received signals of the divided area that is determined as a noise superior area. On the other hand, for a divided area that is determined by the area determination module 13 as a target-echo superior area, the noise-level calculation module 14 does not calculate a noise level, and instead, the interpolation module 15 interpolates or extrapolates the noise level by noise levels for adjacent noise superior areas (described later in detail).

As described above, in this embodiment, an appropriate noise level for the noise removal is calculated based on the received signals of an area where white noise or clutters are dominant (i.e., the noise superior area), and a noise level for a target-echo superior area is calculated by interpolation or extrapolation using the appropriate noise levels of the noise superior areas.

Figure 4:
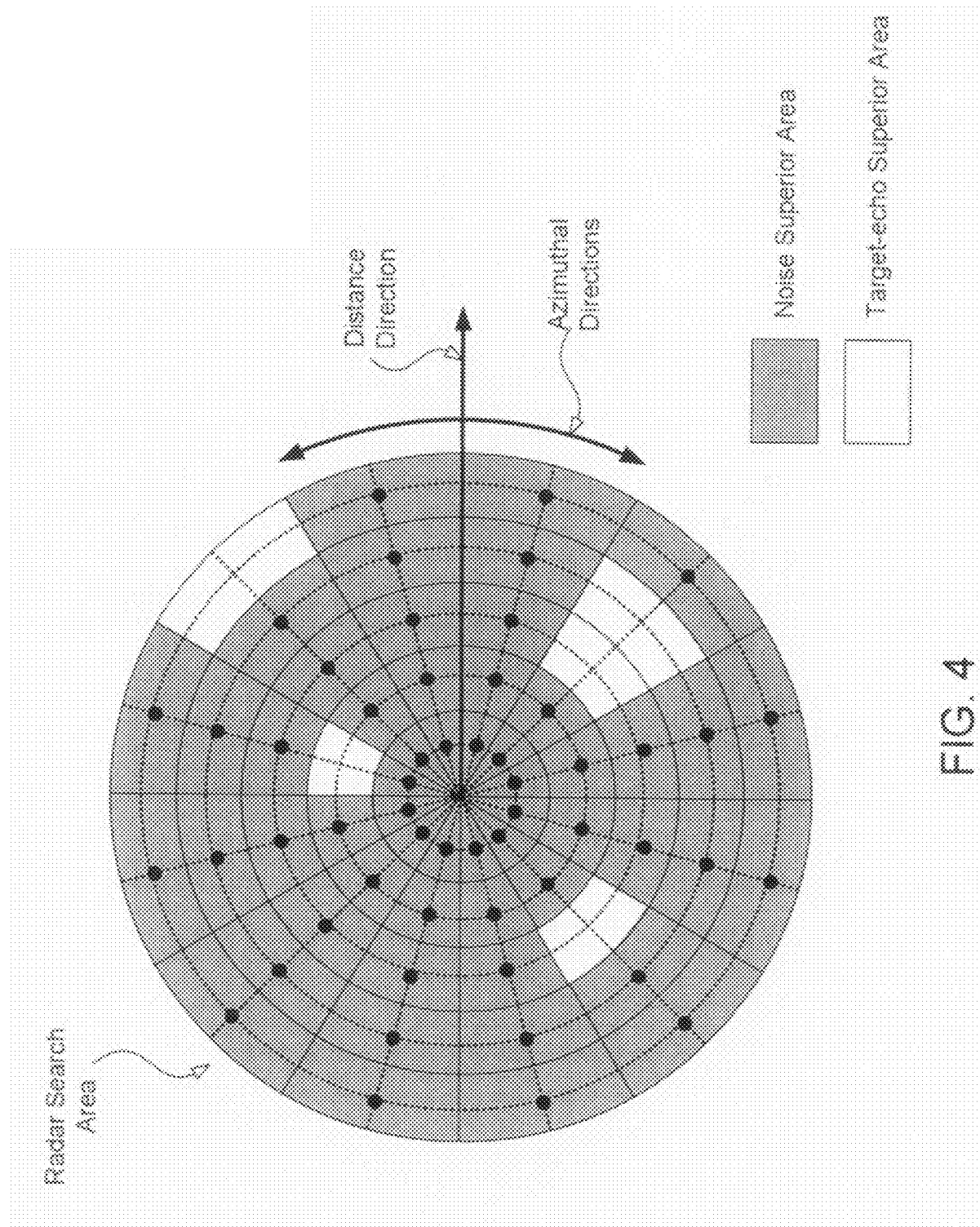
FIG. 4 is a view illustrating a process by an interpolation module of the radar device according to the invention.
Figure 5B:
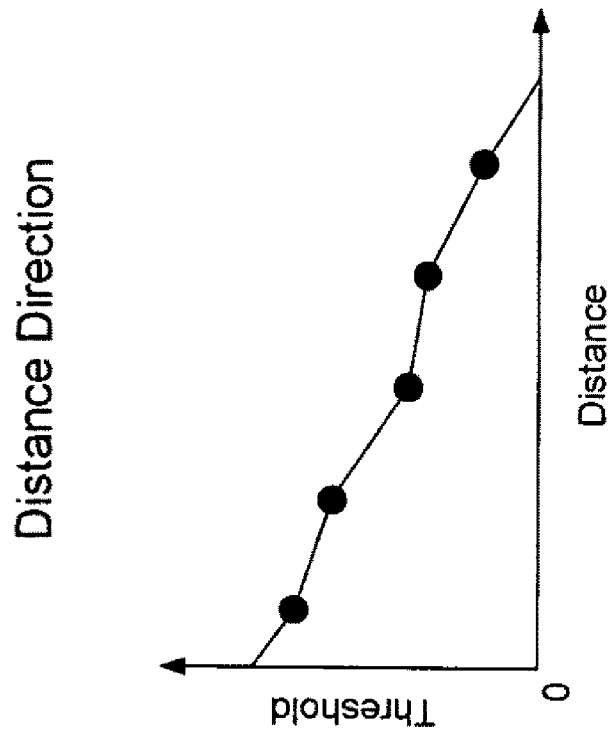
FIGS. 5A and 5B are views illustrating an interpolation or extrapolation process by the interpolation module according to the invention.
Figure 5A:
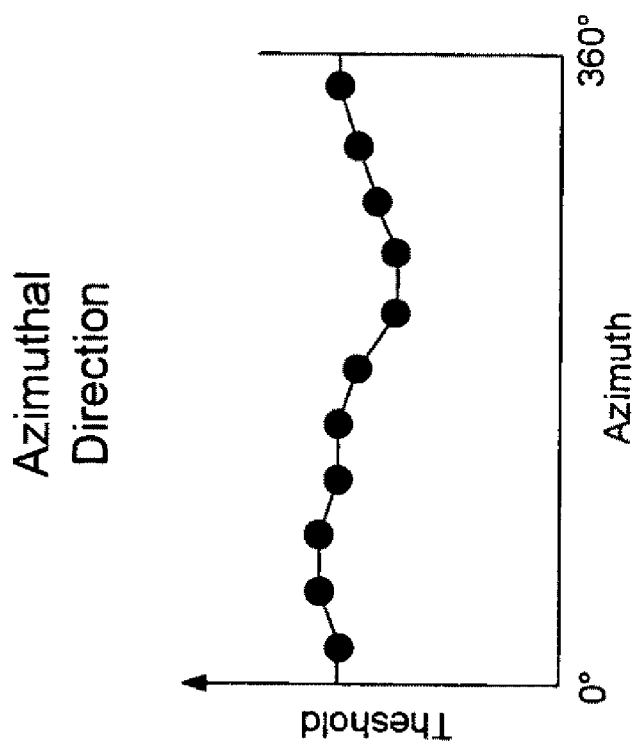

The interpolation module 15 interpolates or extrapolates the noise levels that are calculated by the noise-level calculation module 14 in the azimuthal direction or the distance direction. FIG. 4 is a view illustrating a process by the interpolation module 15. In FIG. 4, a black dot indicates a noise level for each divided area calculated by the noise-level calculation module 14. In the example of FIG. 4, the interpolation module 15 defines a noise level for each divided area calculated by the noise-level calculation module 14 as a noise level at the center location of the divided area concerned. The interpolation module 15 then interpolates or extrapolates this noise level in the azimuthal direction and/or the distance direction to obtain a noise-level distribution for the entire search areas. The interpolation or extrapolation process by the interpolation module 15 may be carried out linearly, for example (see FIGS. 5A and 5B). The interpolation module 15 may further carry out a smoothing process (for example, using a median filter or a moving average filter) to the series of the noise levels after the interpolation or the extrapolation.

The gain control module 16 acquires the noise-level distribution for the entire radar-search area calculated by the interpolation module 15, and for each sampled location of the received signals, then determines a threshold so that a desired noise occurrence probability is acquired for the noise levels of the received signals in the sampled locations. The gain control module 16 then compares the signal levels of the received signals with the determined threshold, and then, it only outputs signals of the signal levels greater than the threshold. Thus, the gain control of the received signals can be performed using an appropriate threshold throughout the radar-search area.

In any case, for areas away from the equipped ship location for greater than a predetermined distance, because white noise typically are dominant rather than clutters, a threshold for separating target object echoes and noises will be a certain fixed value only corresponding to white noise. Thus, the noise-level calculation module 14 and the interpolation module 15 do not necessary calculate the noise levels corresponding to all of the radar-search areas for determining the threshold. Therefore, for example, noise levels may be calculated only for areas in proximity to the equipped ship, and noise levels may not be calculated for areas apart from the equipped ship for greater than the predetermined distance, or a fixed value may be used as the noise level.

Next, referring to FIGS. 6A-6C, 7A-7D, and 8A-8D, an example of the determination process of the noise superior area or the target-echo superior area that is performed by the determination module 12 will be explained. Here, an approach of evaluating symmetry of the frequency-of-appearance distributions will be explained.

Figure 6B:
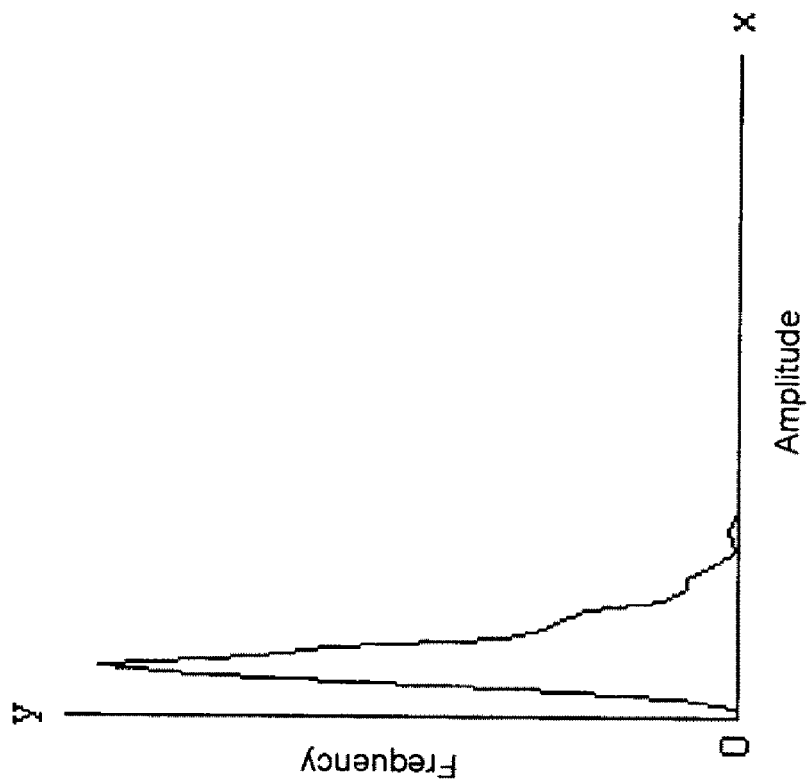
Figure 6A:
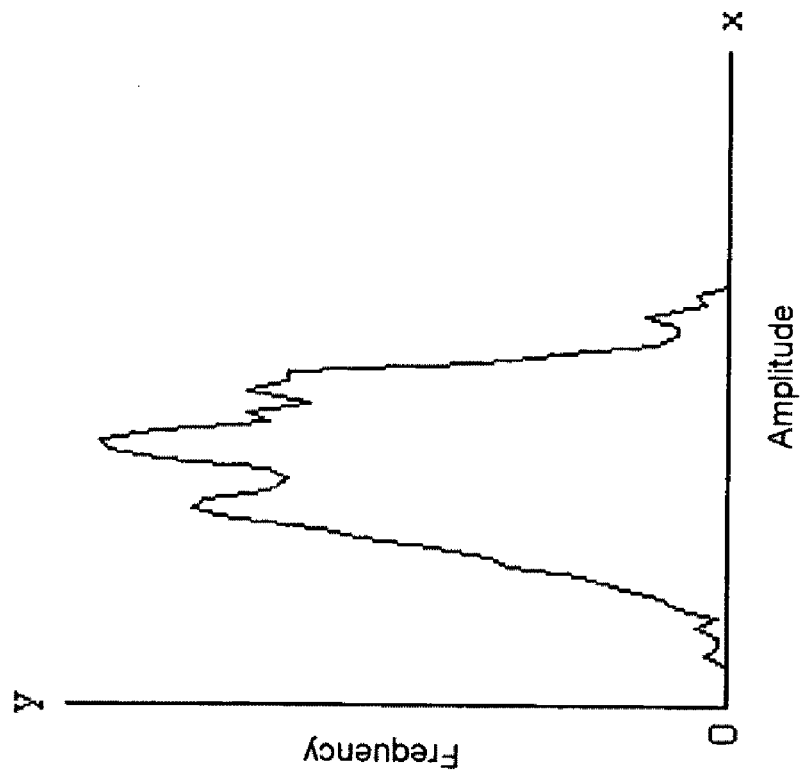

FIGS. 6A-6C are views showing frequency-of-appearance distributions of an area where clutters, white noise, and target object echoes are superior, respectively, and are frequency-of-appearance line plots (frequency polygon) of amplitudes of the received signals as a variable.

In this example, assuming that an $i^{th}$ frequency of appearance in the frequency-of-appearance distribution is y[i], and an amplitude corresponding to y[i] is x[i], all the frequencies of appearance y[i] are plotted on the x-y rectangular coordinates as points (x[i], y[i]).

The frequency-of-appearance line plot can be obtained by connecting these plots in ascending order of x[i]. As may be apparent from FIGS. 6A and 6B, for the area where clutters or white noise are superior, the line plot is approximately symmetrical. On the other hand, as shown in FIG. 6C, for the area where echoes from a target object are superior, the frequency-of-appearance line plot is not symmetrical. Thus, from this aspect, the area determination module 13 can determines whether the area is a noise superior area or a target-echo superior area by evaluating symmetry of the frequency-of-appearance distribution for amplitudes of the received signals as a variable.

Even if the noise level is calculated from a divided area where white noise and clutters are dominant but target object echoes are obtainable from a very small portion, the noise level is hardly influenced by the target object echoes. Therefore, such a divided area is desirable to be determined as a noise superior area. Thus, in order to perform the determination of the noise superior area or the target-echo superior area without being influenced by target object echoes with low frequencies of appearance, the determination module 12 performs a determination based on frequencies of appearance greater than a predetermined value while ignoring frequencies of appearance less than the predetermined value. The predetermined value may preferably be determined based on the maximum frequency of appearance. For example, the predetermined value may be set to N % of the maximum frequency of appearance (N>0).

Next, the determination process performed by the determination module 12 will be explained in more detail. FIGS. 7A-7D and 8A-8D are graphs for illustrating the determination process by the area determination module according to this embodiment, where FIGS. 7A-7D illustrate a first determination approach, and FIGS. 8A-8D illustrate a second determination approach.

Here, definitions of terms to be used for explanations of the determination approaches are shown as follows:

(1) x-coordinate and y-coordinate of a point in the frequency-of-appearance line plot are referred to as "amplitude" and "frequency of appearance" of this point, respectively.

(2) Among those points in the frequency-of-appearance line plot, a point having the maximum frequency of appearance is referred to as the "maximum frequency-of-appearance point."

(3) Among those points in the frequency-of-appearance line plot, a point having k % frequency of appearance of the maximum frequency of appearance is referred to as a "k % frequency-of-appearance point" (0<k<100).

(4) Among the k % frequency-of-appearance points, a point having amplitude less than the amplitude of the maximum frequency-of-appearance point is referred to as a "below-k % frequency-of-appearance point."

(5) Among the k % frequency-of-appearance points, a point having amplitude greater than the amplitude of the maximum frequency-of-appearance point is referred to as an "above-k % frequency-of-appearance point."

[1. First Determination Approach]

Figure 7B:
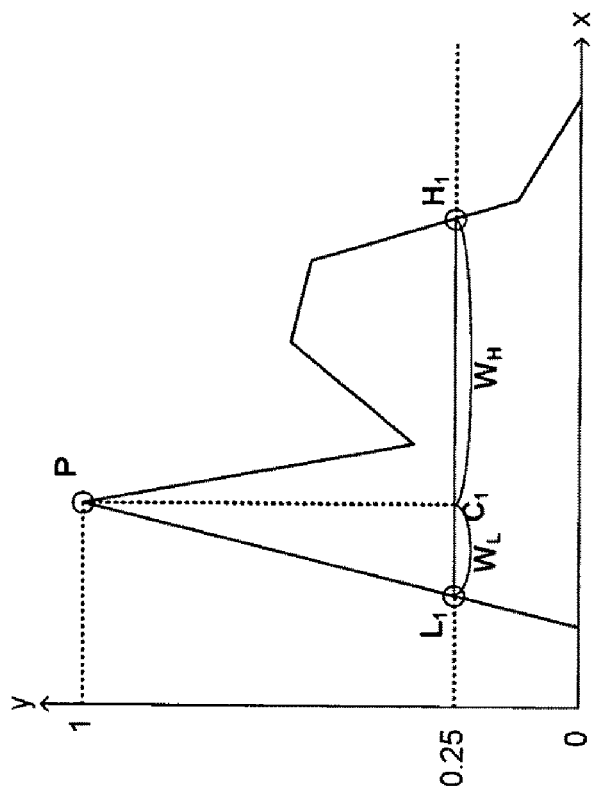
FIGS. 7A-7D are views illustrating a first determination approach by the area determination module of the radar device according to the invention.
Figure 7A:
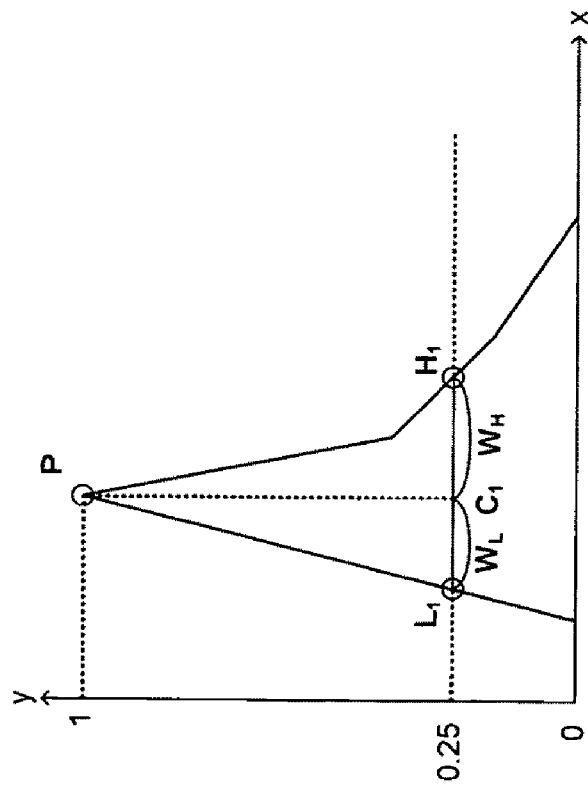
Figure 7D:
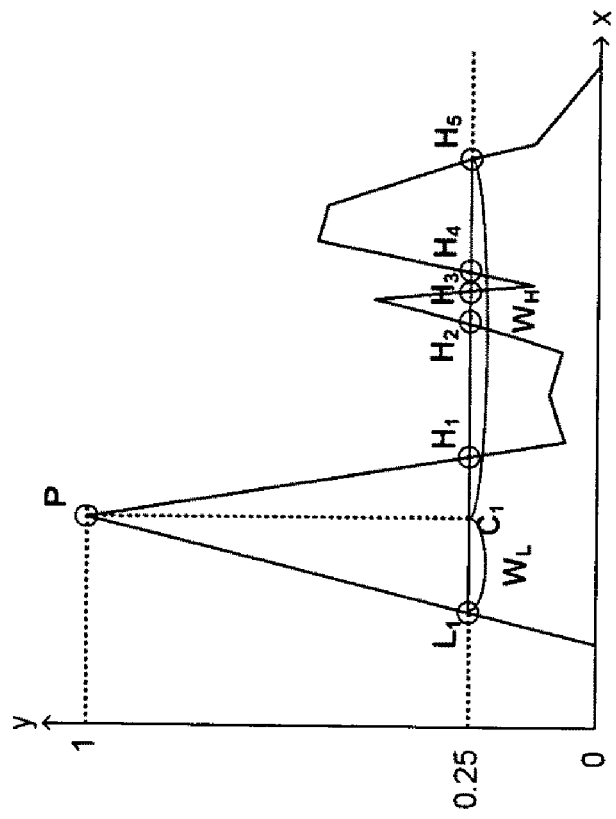
Figure 7C:
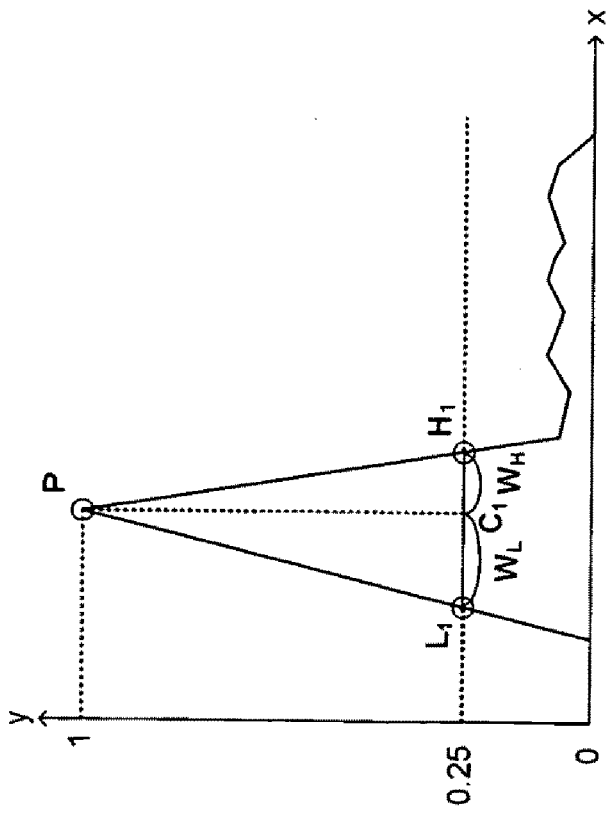

FIGS. 7A-7D are graphs illustrating the first determination approach by the area determination module of the radar device according to this embodiment, and are frequency-of-appearance line plots of amplitudes of the received signals as a variable. Specifically, FIG. 7A is a frequency-of-appearance line plot of an area where clutters are superior, FIGS. 7B and 7D are frequency-of-appearance line plots of areas where clutters and target object echoes are intermingled, and FIG. 7C is a frequency-of-appearance line plot of an area where target object echoes can be obtained from a very small part of a divided area, but clutters are dominant as the whole. Each frequency-of-appearance line plot is normalized by the maximum frequency of appearance in the plot.

As for the first determination approach, the area determination module 13 determines whether the area is a noise superior area or a target-echo superior area based on the maximum frequency-of-appearance point and the N % frequency-of-appearance point (0<N<100).

The area determination module 13 first calculates a coordinate of the maximum frequency-of-appearance point and the N % frequency-of-appearance point. Here, the point P shown in FIGS. 7A-7D is the maximum frequency-of-appearance point, and the point $L_1$ and the points $H_1$-$H_5$ shown in FIGS. 7A-7D are the N % frequency-of-appearance points (here, N=25). Next, the area determination module 13 evaluates symmetry of the frequency-of-appearance distribution from the relationship between the maximum frequency-of-appearance point and the N % frequency-of-appearance points.

As shown in FIGS. 7A-7D, a point vertically below from the maximum frequency-of-appearance point P and intersecting the straight line $L_1$-$H_1$ is set to "$C_1$." Further, a distance between the point at which amplitude is the minimum among the below-N % points and the point $C_1$ is set to "$W_L$," and a distance between the point where amplitude is the maximum among the above-N % points and the point $C_1$ is set to "$W_H$." In the example of FIGS. 7A-7C, a length of the line segment $C_1$-$L_1$ is "$W_L$," and a length of the line segment $C_1$-$H_1$ is "$W_H$." In the example of FIG. 7D, a length of the line segment $C_1$-$L_1$ is "$W_L$," and a length of the line segment $C_1$-$H_5$ is "$W_H$."

The area determination module 13 calculates a ratio of $W_L$ and $W_H$, and when the ratio is within a predetermined range, it then determines that the frequency-of-appearance distribution is symmetrical, and also determines that the corresponding divided area is a noise superior area. On the other hand, when the ratio is not within the predetermined range, it then determines that the frequency-of-appearance distribution is not symmetrical, and it also determines that the corresponding divided area is a target-echo superior area. The threshold (i.e., the above-described "predetermined range") to be used for the determination of the noise superior area or the target-echo superior area is set to a value so that FIGS. 7A and 7C are determined as a noise superior area, and FIGS. 7B and 7D are determined as a target-echo superior area, based on actual measurements.

Other than described above, it may also be possible to use the number of the above-N % frequency-of-appearance points and the number of the below-N % frequency-of-appearance points, or a ratio of these numbers as an index by which symmetry of the frequency-of-appearance distributions is evaluated. Further, the area determination module 13 may perform the determination of the noise superior area or the target-echo superior area by pattern recognition using a neural network, etc., by using feature amounts, such as values of $W_L$ and $W_H$, the number or coordinate of the N % frequency-of-appearance points, as described above.

[2. Second Determination Approach]

Figure 8A:
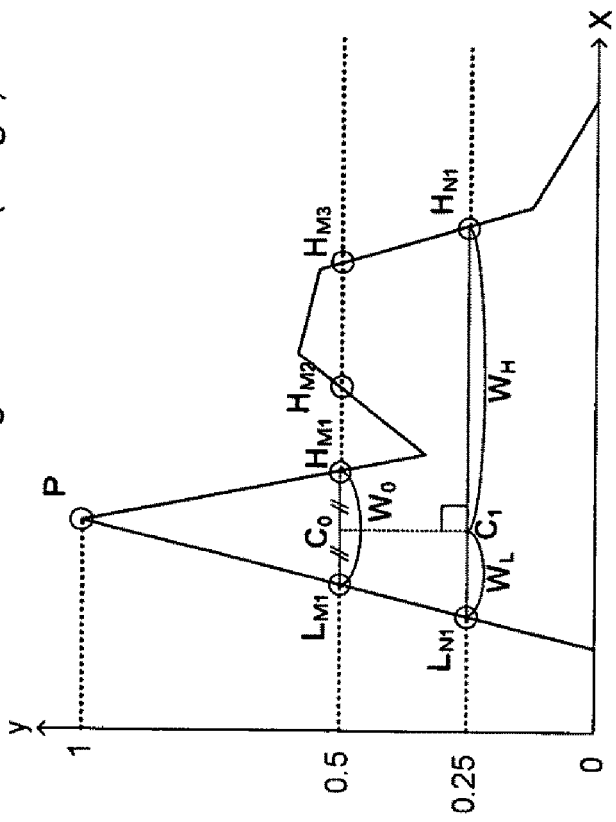
FIG. 8A-8D are views illustrating a second determination approach by the area determination module of the radar device according to the invention.
Figure 8B:
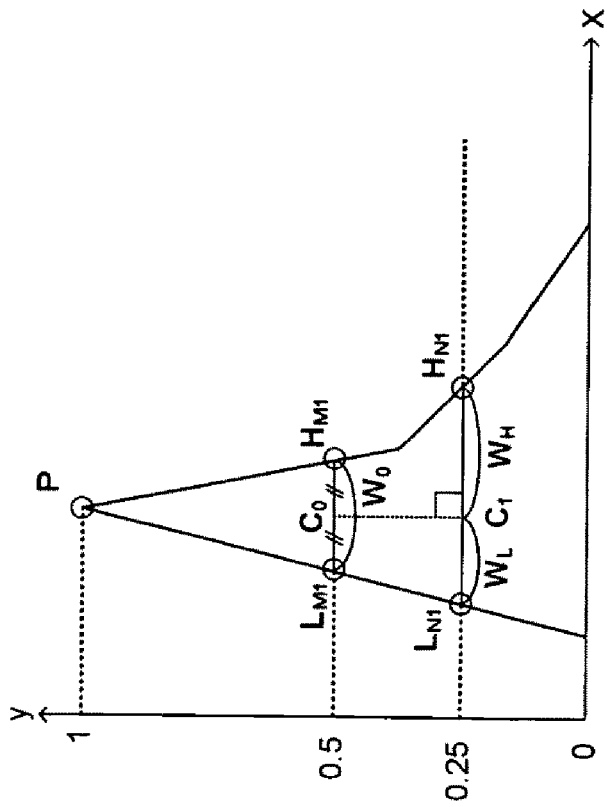
Figure 8D:
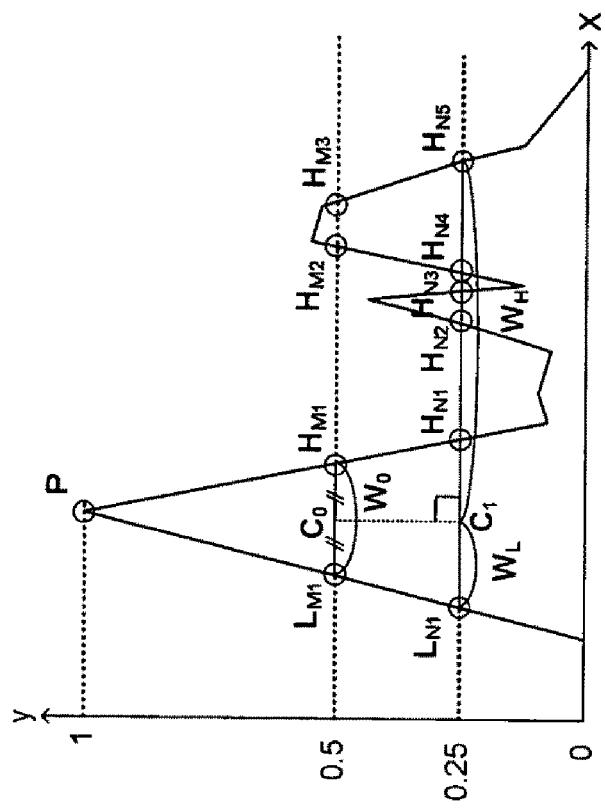
Figure 8C:
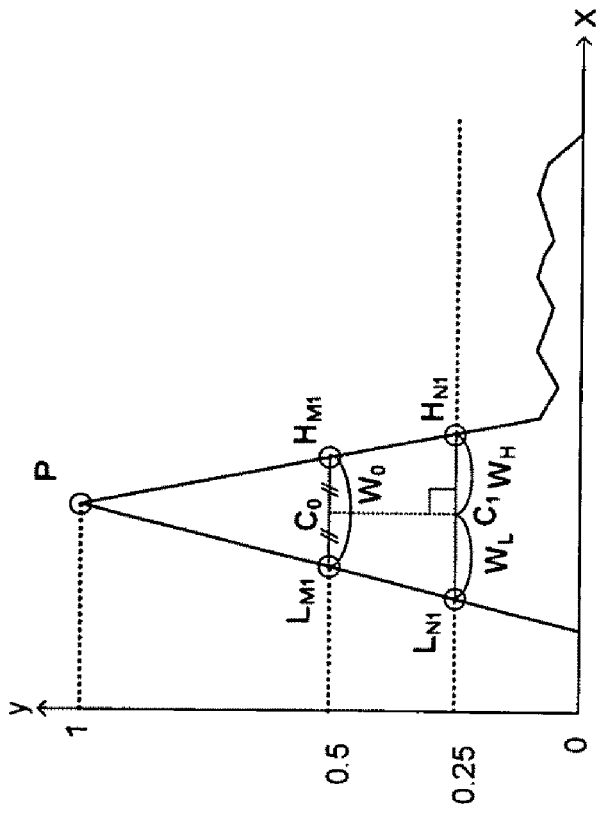

FIGS. 8A-8D are graphs illustrating the second determination approach by the area determination module of the radar device according to this embodiment. The graphs are illustrated as frequency-of-appearance line plots of amplitudes of the received signals to be a variable. Specifically, FIG. 8A is a frequency-of-appearance line plot of an area where clutters are superior, and FIGS. 8B and 8D are frequency-of-appearance line plots of an area where clutters and target object echoes are intermingled. FIG. 8C is a frequency-of-appearance line plot of an area where target object echoes are obtained from a very small part of a divided area, but clutters are dominant as the whole area. Each frequency-of-appearance line plot is normalized with the maximum frequency of appearance in the plot.

As for the second determination approach, the area determination module 13 determines whether the area is a noise superior area or a target-echo superior area based on N % frequency-of-appearance points (0<N<100) and M % frequency-of-appearance points (0<M<100, M≠N).

The area determination module 13 calculates coordinates of the N % frequency-of-appearance points and the M % frequency-of-appearance points. The point $L_{N1}$ and the points $H_{N1}$-$H_{N5}$ shown in FIGS. 8A-8D are N % frequency-of-appearance points (here, N=25), and the point $L_{M1}$ and the points $H_{M1}$-$H_{M3}$ are M % frequency-of-appearance points (here, M=50). Next, the area determination module 13 evaluates symmetry of the frequency-of-appearance distributions from the relationship between the N % frequency-of-appearance points and the M % frequency-of-appearance points.

Here, as shown in FIGS. 8A-8D, a distance between the point $L_{M1}$ at which an amplitude is the maximum among below-M % points and the point $H_{M1}$ at which an amplitude is the minimum among above-M % points is set to "$W_0$." Further, a point vertically below from a midpoint $C_0$ of line segment $L_{M1}$-$H_{M1}$, and intersecting a straight line $L_{N1}$-$H_{N1}$ is assumed to be a point "$C_1$." A distance between a point at which an amplitude is the minimum among below-N % points and a point $C_1$ is set to "$W_L$," and a distance between a point at which an amplitude is the maximum among above-N % points and the point C1 is set to "$W_H$." In the example of FIGS. 8A-8C, a length of the line segment $C_1$-$L_{N1}$ is "$W_L$," and a length of the line segment $C_1$-$H_{N1}$ is "$W_H$." In the example of FIG. 8D, a length of the line segment $C_1$-$L_{N1}$ is "$W_L$," and a length of the line segment $C_1$-$H_{N5}$ is "$W_H$."

The area determination module 13 calculates a ratio of $W_L$ and $W_H$, and when the ratio is within a predetermined range, it then determines that the frequency-of-appearance distribution is symmetrical, and then determines that the corresponding divided area is a noise superior area. On the other hand, when the ratio is not within the predetermined range, it determines that the frequency-of-appearance distribution is not symmetrical, and it also determines that the corresponding divided area is a target-echo superior area. The threshold (the above-described "predetermined range") used for the determination of the noise superior area or the target-echo superior area is set to a value so that FIGS. 8A and 8C are determined as a noise superior area, and FIGS. 8B and 8D are determined as a target-echo superior area, based on actual measurements.

Other than described above, it may also be possible to use the number of the above-N % frequency-of-appearance points and the number of the below-N % frequency-of-appearance points or a ratio of these numbers, or the number of the above-M % frequency-of-appearance points and the number of the below-M % frequency-of-appearance points or a ratio of these numbers as an index by which symmetry of the frequency-of-appearance distributions is evaluated. Further, the area determination module 13 may perform the determination of the noise superior area or the target-echo superior area by pattern recognition using a neural network, etc., by using feature amounts, such as values of $W_O$, $W_L$, and $W_H$, the number or coordinate of the N % frequency-of-appearance points and the N % frequency-of-appearance points, as described above.

Further, it may be determined that the corresponding divided area is a noise superior area or a target-echo superior area based on the results of the above-described determination process in which a noise superior area or a target-echo superior area is determined by evaluating symmetry of the frequency-of-appearance distribution, and the results of the following determination processes [1]-[3]. By appropriately combining these determination processes, it may be possible to reduce the probability that the incorrect determination will occur.

[1] When the total sum of the frequencies of appearance corresponding to the amplitude greater than a predetermined value $A_H$ is greater than a predetermined value $S_H$, the corresponding divided area is determines as a target-echo superior area.

[2] When the total sum of the frequencies of appearance corresponding to the amplitude less than a predetermined value $A_L$ is greater than a predetermined value $S_L$, the corresponding divided area is determined as a noise superior area.

[3] When the noise level calculated by the noise-level calculation module 14 is greater than a predetermined value $A_{TH}$, the corresponding divided area is determined as a target-echo superior area.

Here, the predetermined values $A_H$, $A_L$, and $A_{TH}$ may vary in accordance with a distance from the equipped ship to each divided area.

Figures 9A, 9B, 9C:
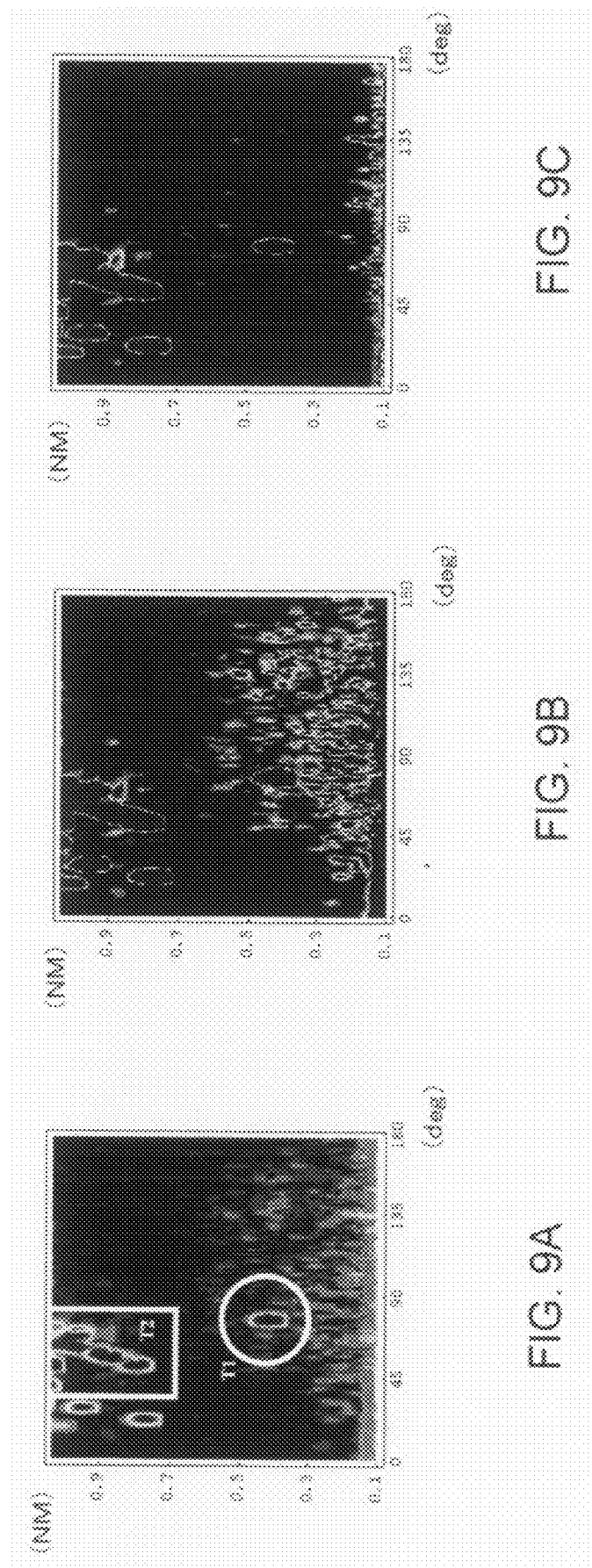
FIGS. 9A-9C are views illustrating effects of the invention.

FIGS. 9A-9C are diagrams illustrating effects of this embodiment. FIG. 9A shows an image that is acquired by converting the radar received signals from specific ocean area into 9-bit digital data. In FIG. 9A, echoes from a buoy are displayed in a portion T1 surrounded with a circle, and the echoes from land are displayed in a portion T2 surrounded with a rectangle. FIGS. 9B and 9C show images of the same received signals as FIG. 9A, but the range of amplitudes to be displayed is narrowed. The image of FIG. 9B is obtained when the threshold for comparison with the received signal levels is fixed, and the image of FIG. 9C is obtained when the threshold for comparison with the received signal levels varies using the technique according to this embodiment as described above. In FIGS. 9A-9C, the horizontal axis indicates an azimuthal direction (deg), and the vertical axis indicates a distance from the equipped ship (NM).

As shown in FIG. 9B, when the threshold is fixed, the echoes from the land can be visually well-recognized, while the echoes from the buoy cannot be visually recognized clearly as the echoes are intermingled with clutters. On the other hand, as shown in FIG. 9C, when the threshold is controlled using the technique according to this embodiment, it becomes possible to clearly recognize both the echoes from the buoy and the echoes from the land.

As described above, according to this embodiment, it is possible to calculate an appropriate noise level for separating target object echoes from noises by performing the determination of the noise superior area or the target-echo superior area for each predefined divided area within the search area, and then calculating the noise level using the received signals of an area determined as the noise superior area. Even if interfering waves from other radars or target object echoes are included in the received signals, these influences can be eliminated and, thus a distribution of the appropriate noise levels can be obtained by obtaining a noise-level distribution for other areas by interpolating or extrapolating the noise level calculated for the noise superior area. In addition, it is possible to appropriately separate target object echoes and noises by the gain control module 16, using distribution of the appropriate noise level calculated as described above, by determining a predetermined threshold for comparison with the received signal levels.

Embodiment 2

Other than the gain control process described above, the radar device for marine vessels typically involves a scanning correlation process that smoothes the image obtained while a radar antenna rotates once from a correlation between a present radar image and a past radar image to remove noises contained in the received data, such as white noise and clutters.

Figure 10:
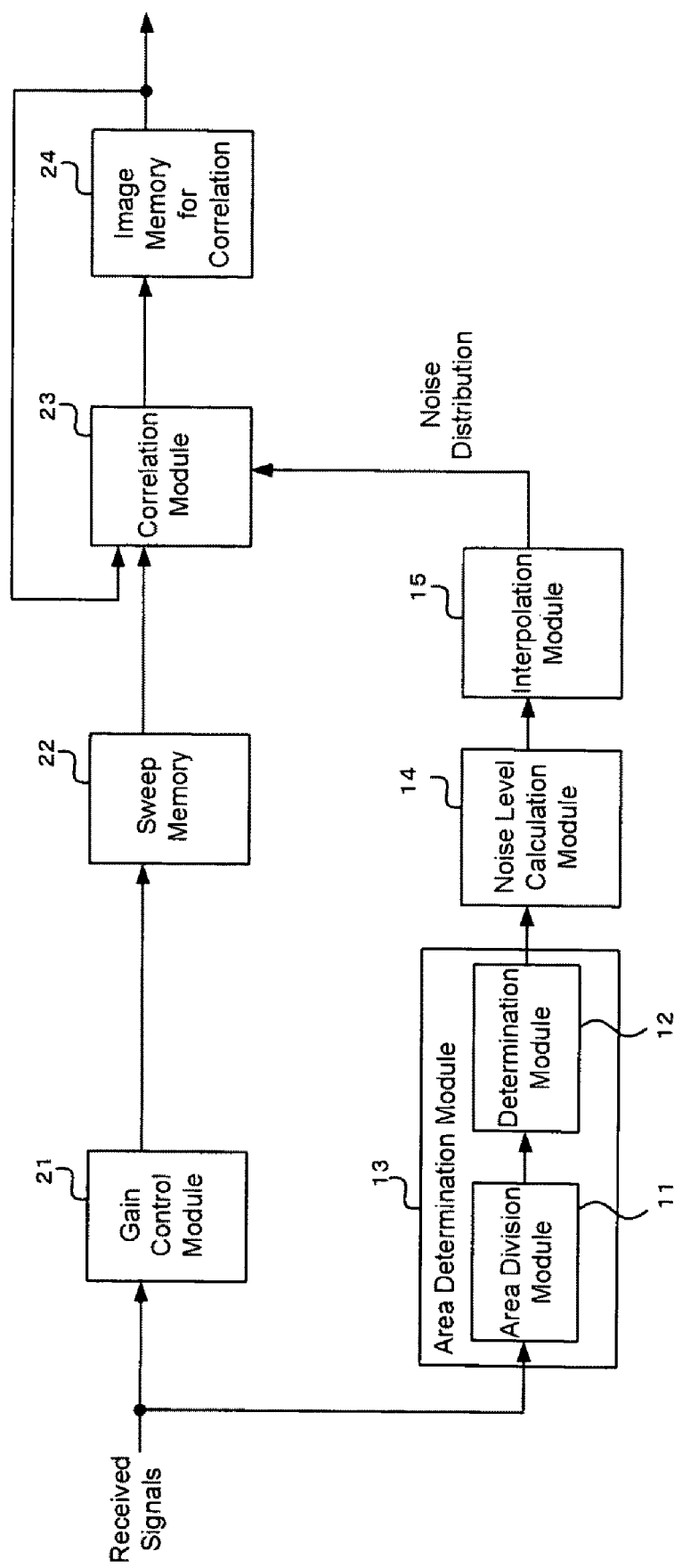
FIG. 10 is a block diagram illustrating a correlation process by the radar device according to the invention.

FIG. 10 is a block diagram illustrating a radar device according to another embodiment that performs the scanning correlation process. As shown in FIG. 10, the radar device according to this embodiment, includes an area determination module 13 provided with an area dividing module 11 and a determination module 12, a noise-level calculation module 14, an interpolation module 15, a gain control module 21, a sweep memory 22, a correlation module 23, and an image memory 24 for the correlation process. In this embodiment, similar reference numerals are assigned to similar components to those of the radar device in the previous embodiment and, thus, explanation thereof herein will be omitted.

The gain control module 21 compares amplitudes of the received signals acquired for the radar-search area with a predetermined threshold, and then outputs the received signals that have amplitudes greater than the predetermined threshold. As used herein, the term "predetermined threshold" may be a threshold defined with a known technique, or may be a threshold defined with the technique of the previous embodiment.

The sweep memory 22 stores the received signals for one sweep in real time, and then outputs the data for one sweep to the correlation module 23 before the signals that will be received by the next transmission are written in the memory. As used herein, the term "one sweep" includes one transmission and one reception of a signal, and thousands of transmissions and receptions (i.e., sweeps) are typically repeated while one rotation of the radar antenna.

The correlation module 23 performs a scanning correlation process using the received signals inputted from the sweep memory 22, and the image data for a previous rotation of the antenna corresponding to the received signals stored in the image memory 24 for the correlation process, and again causes the image memory 24 for the correlation process to store the correlation-processed data.

For example, assuming that the received signals inputted from the sweep memory 22 are "R(t)," and the correlation-processed image data that are inputted from the image memory 24 for the correlation process and are at a pixel location corresponding to the received signals acquired previously is "Z(t−1)," the correlation module 23 calculates correlation-processed image data Z(t) for one rotation of the radar antenna, using the following equation.

$$Z(t)=\gamma \cdot R(t)+\delta \cdot Z(t-1) \quad (1)$$

Here, $\gamma$ and $\delta$ are arbitrary numbers, and the correlation process can be modified by changing $\gamma$ and $\delta$.

The correlation module 23 of the radar device according to this embodiment determines $\gamma$ and $\delta$ that are weights of the present radar image data and the past radar image data, respectively, based on the noise-level distribution calculated by the interpolation module 15, and then performs the correlation process of the present radar image data and the past radar image data based on the determined weights. The correlation module 23 calculates a noise level for each pixel based on the noise-level distribution obtained by the interpolation module 15. The correlation module 23 then relatively decreases $\gamma$ and increases $\delta$ for a pixel with a high noise level to increase the influence of image data for the previous rotation delta, while relatively increases $\gamma$ and decreases $\delta$ for a pixel with a low noise level to decrease the influence of image data for the previous rotation delta. Thus, it becomes possible to perform the correlation process according to the noise-level distribution for the search area.

The image memory 24 for the correlation process has the capacity to store the received data for one rotation of the radar antenna (correlation-processed image data), and feeds back the correlation-processed image data for the previous rotation to the correlation module 23 for the scanning correlation process. When an image of a display (not illustrated) is raster scanned, the image memory 24 for the correlation process outputs the correlation-processed image data synchronizing with the raster scanning. Here, an operator can recognize the location and the motion of a target object referring to the scanning-correlation-processed image by differing brightness and displaying colors according to the data value for each pixel data of the correlation-processed image data.

In this embodiment, although the correlation module 23 of the radar device has been explained as what performs the correlation process with image data for a previous rotation, the image data for performing the correlation process with the present radar image may be any past radar image data. Thus, a correlation process of image data for the past several rotations with the present radar image may be performed, for example.

Figure 11:
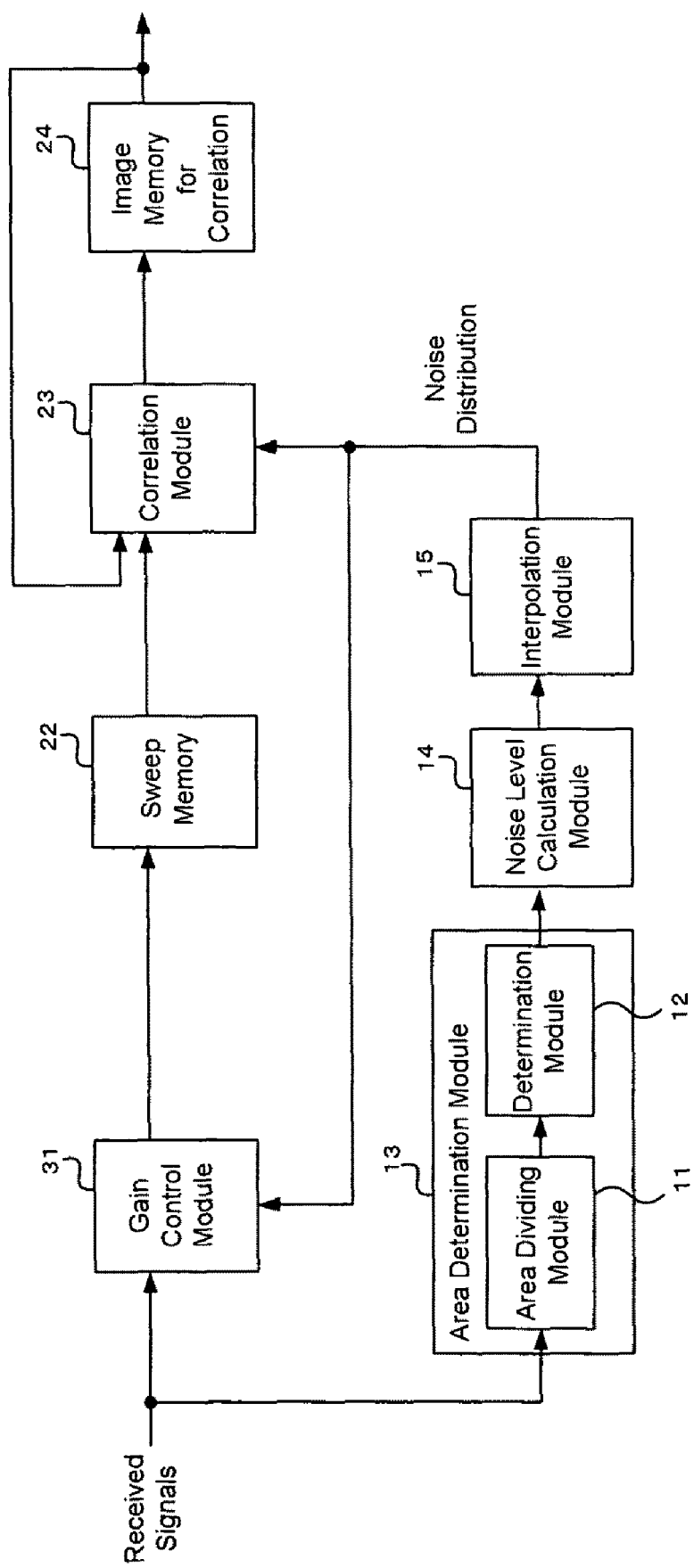
FIG. 11 is a block diagram illustrating a relationship between an automatic gain control process and a correlation process by the radar device according to the invention.

FIG. 11 is a block diagram illustrating another configuration of the radar device, according to this embodiment. The difference from the configuration of FIG. 10 is that a distribution of the noise level generated by the interpolation module 15 is outputted to both the gain control module 31 and the correlation module 23, and the gain control module 31 changes the threshold to be compared with the amplitudes of the received signals between the case where the correlation process is performed by the correlation module 23 and is not performed. A level of echoes from a target object is likely the same level continuously from the past radar image to the present radar image, while a level for unnecessary signals, such as clutters, significantly changes from the past radar image to the present radar image, compared with the level of the target object echoes. The scanning correlation process utilizes this characteristic to display the echoes from the target object more clearly by considering the correlation of the present radar image and the past radar image, and, thereby removing the unnecessary signals, such as clutters that are typically generated at random over time.

On the other hand, the gain control performed by the gain control module 31 compares signal levels of the received signals acquired for a radar-search area with a predetermined threshold, and then outputs only received signals with amplitudes greater than the predetermined threshold. Thus, if the predetermined threshold that is determined based on a noise-level distribution generated by the interpolation module 15 is high, target object echoes having a level below the threshold will be removed. Therefore, the removed signals from the target object echoes cannot be detected even if the correlation process is performed by the correlation module 23.

For this reason, with this example configuration, the gain control module 31 shown in FIG. 11 changes the threshold to be compared with the amplitudes of the received signals between the case where the correlation process is performed by the correlation module 23 and is not performed. More specifically, when performing the correlation process by the correlation module 23, the gain control module 31 sets the predetermined threshold defined based on the noise-level distribution to a lower value to prevent the echoes from the target object with a weak level below the noise level from being removed. Therefore, when the correlation module 23 performs the correlation process, the echoes from the target object of a level lower than noise level can be detected by the correlation process.

On the other hand, the correlation process is not performed by the correlation module 23, the gain control module 31 adjusts the predetermined threshold defined based on the noise-level distribution so that the predetermined threshold corresponds to a desired noise occurrence probability of the predetermined threshold, and then outputs signals from which the noises are removed at the optimum level.

For example, if a switching device, such as a switch, to perform ON/OFF of the correlation process is provided to the radar device, the gain control module 31 may change the predetermined threshold based on an ON/OFF instruction of the correlation process by the operator, as described above. Thus, it is possible to appropriately separate the target object echoes and the noises using the noise-level distribution generated by the interpolation module 15.

Embodiment 3

Figure 12:
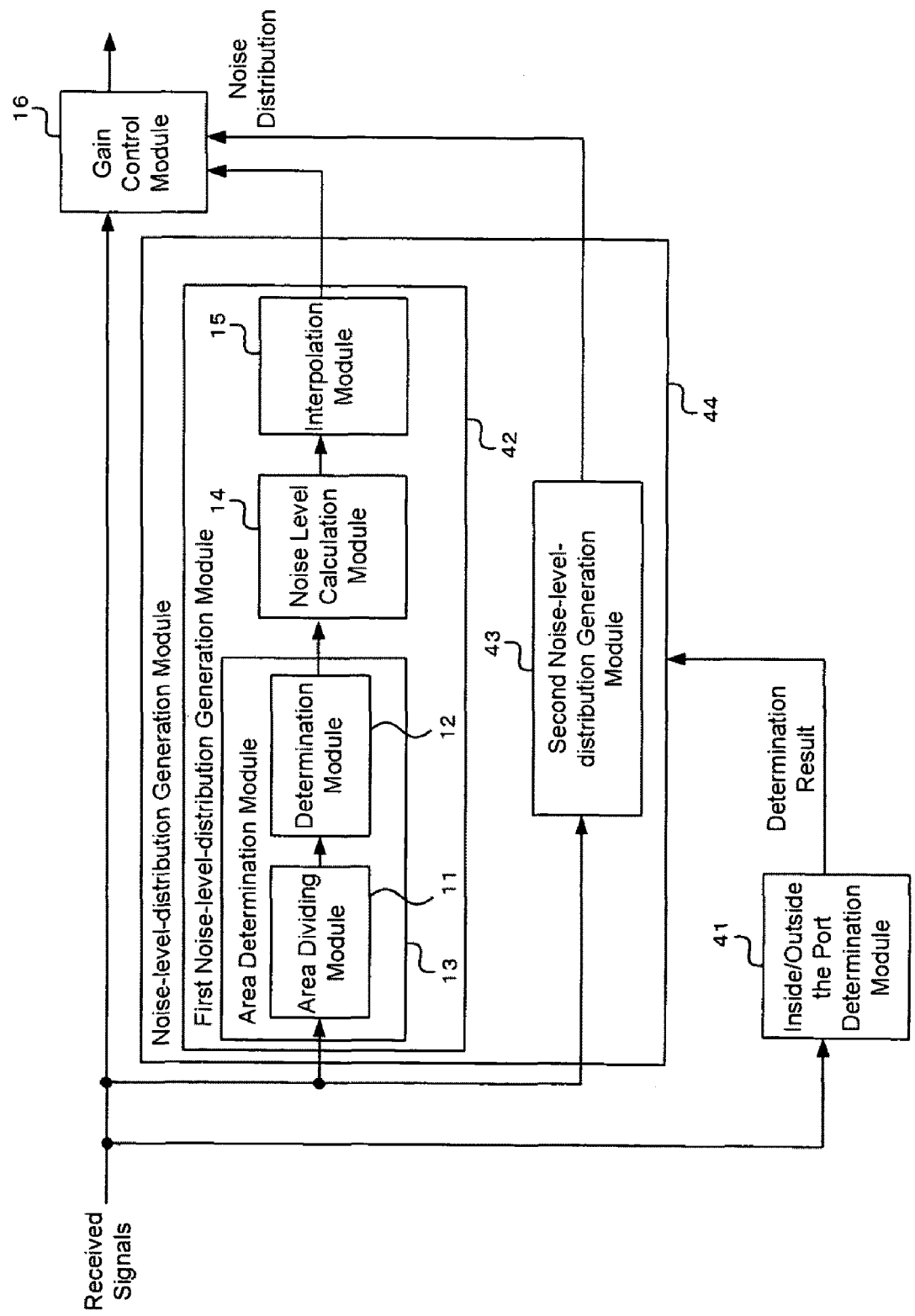
FIG. 12 is a block diagram showing a configuration of a radar device according to Embodiment 3 of the invention.

FIG. 12 is a block diagram showing a configuration of a radar device according to still another embodiment of the invention. As shown in FIG. 12, the radar device according to this embodiment includes a noise-level-distribution generation module 44 provided with a first noise-level-distribution generation module 42 and a second noise-level-distribution generation module 43, a gain control module 16, and a inside-or-outside-the-port determination module 41. The first noise-level-distribution generation module 42 includes an area determination module 13 provided with an area dividing module 11 and a determination module 12, a noise-level calculation module 14, and an interpolation module 15. Similar components to that of the radar device of Embodiment 1 are assigned with similar reference numerals and, thus, explanation thereof will be omitted herein.

The inside-or-outside-the-port determination module 41 determines whether the ocean area where an equipped ship is located is inside the port area or outside the port area. As used herein, the term "port area" may be, but not limited to, an ocean area where many artificial structures, such as quays, breakwaters, piers, and other ships exist (e.g., circumference of a harbor, inside of the harbor, and a canal, etc.). The port area may also be any port of river or lake or the like, other than ocean. The noise-level-distribution generation module 44 generates a noise-level distribution of a radar-search area using different algorithms based on the determination result of the inside-or-outside-the-port determination module 41. Here, the noise-level distribution to be used for outside the port area is generated by the first noise-level-distribution generation module 42, while the noise-level distribution to be used for inside the port area is generated by the second noise-level-distribution generation module 43.

Below, an example of the determination process by the inside-or-outside-the-port determination module 41 will be explained in detail.

[1. Determination Scheme Using Amplitude Values of Received Signals]

Typically, the radar device transmits pulse-like electric waves at a predetermined cycle from an antenna that rotates in a horizontal surface at a predetermined cycle, and receives the electric waves reflected from a target object. A receiving module of the radar device converts the received electric waves into electric signals to sample them at a predetermined sampling rate, and then converts them into digital signals. The inside-or-outside-the-port determination module 41 then performs the following determination processes (1) and (2) using the received signals converted into the digital signals by the receiving module.

[(1) First Determination Scheme]

Figure 13:
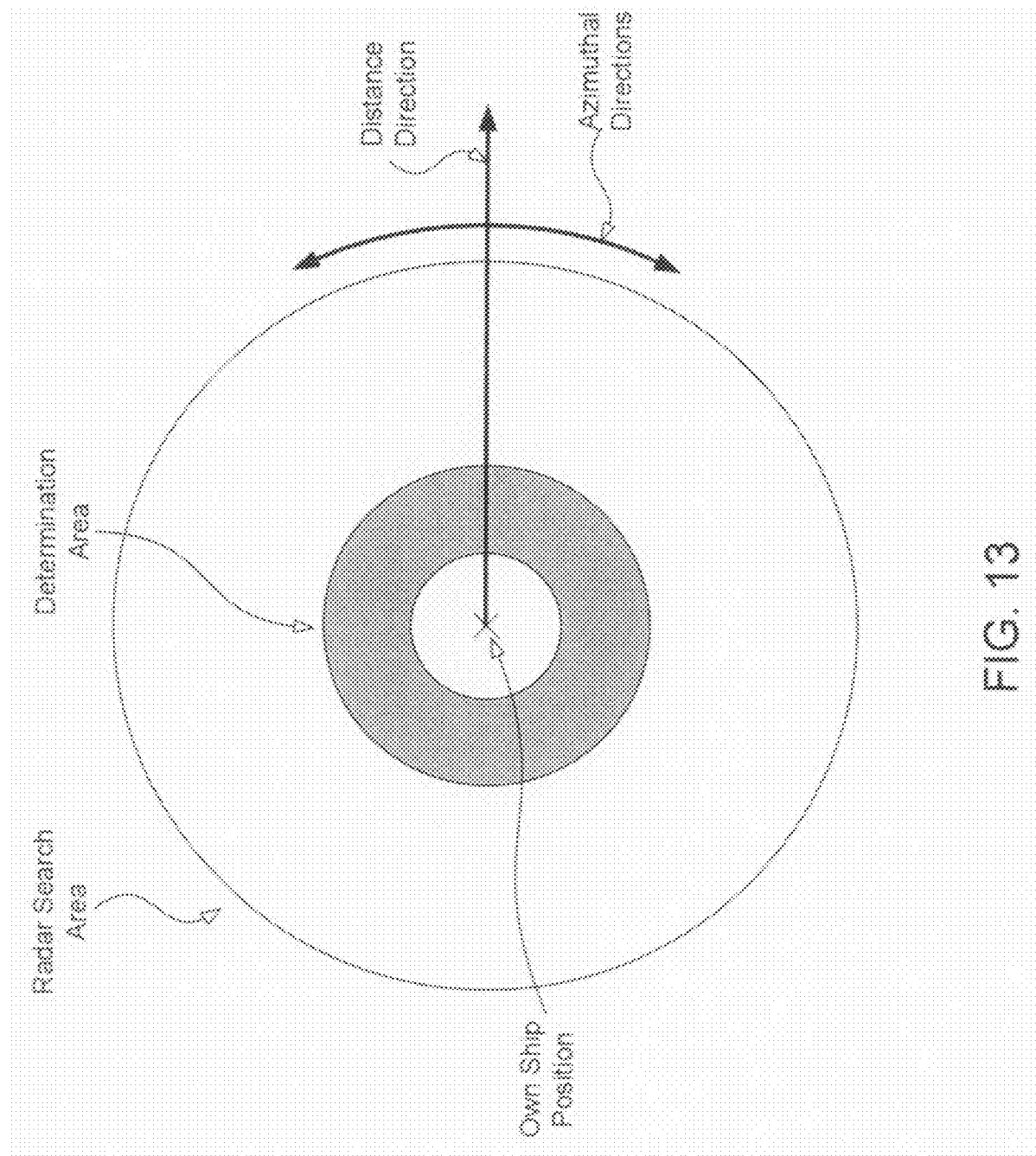
FIG. 13 is a view illustrating a determination process by a inside-or-outside-the-port determination module.

FIG. 13 is a diagram illustrating the determination process by the inside-or-outside-the-port determination module 41. As shown in FIG. 13, the inside-or-outside-the-port determination module 41 determines whether an equipped ship is located inside the port area or outside the port area based on amplitudes of the received signals for a port determining area that may be defined as an area of a predetermined distance range from the equipped ship (for example, 0.1-0.2 NM).

For example, the inside-or-outside-the-port determination module 41 extracts the received signals of the port determining area from the received signals of the entire search area, and then counts the number of data (Nnum) among the extracted received signals that have amplitudes greater than a predetermined amplitude (Aref). The inside-or-outside-the-port determination module 41 then determines that the equipped ship is located inside the port area when the count (Nnum) is greater than the predetermined value (Nref), or the equipped ship is located outside the port area when less than the predetermined value (Nref). The magnitudes of the amplitudes of the received signals depend on the transmission pulse width and, thus, the values of Aref and Nref may be changed according to the transmission pulse width. If the sampling rate of the received signals differs according to the detection ranges, the values of Aref and Nref may be changed according to the sampling rate of the received signals.

[(2) Second Determination Scheme]

Typically, the received signals for inside the port area has particularly a large amplitude in an azimuthal direction to which a large building exists, and in an azimuthal direction into which a transmission pulse enters to the side of an object, such as a quay, at right angles, for example. Thus, the received signals have tendency in which amplitudes of the received signals are greatly different for each azimuthal direction, compared with the received signals from outside the port area. On the other hand, received signals from the ocean are typically small compared to that from inside the port. However, for example, when many ships exist all around the equipped ship, the count (Nnum) for the first determination scheme described above takes a large value. Thus, the inside-or-outside-the-port determination module 41 may unintentionally determine that the equipped ship is located inside the port area even when the equipped ship is actually located outside the port area.

For this reason, the second determination scheme is to determine whether the equipped ship is actually located inside the port area or outside the port area in consideration of the difference in the amplitudes for each azimuthal direction.

Figure 14:
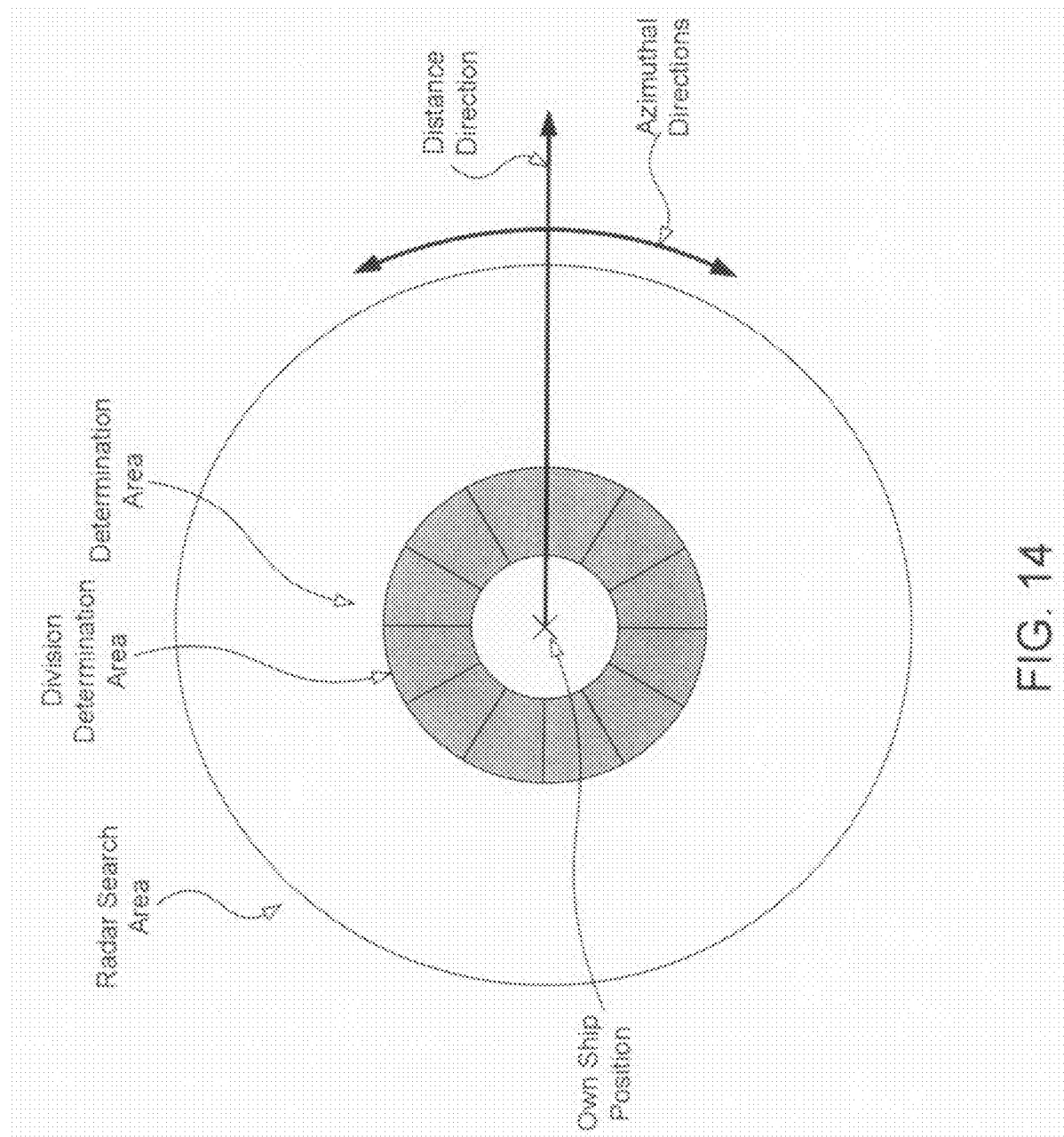
FIG. 14 is a view illustrating the determination process by the inside-or-outside-the-port determination module in consideration of azimuthal direction.

FIG. 14 is a diagram illustrating the determination process in consideration of the azimuthal direction by the inside-or-outside-the-port determination module 41.

As shown in FIG. 14, the inside-or-outside-the-port determination module 41 determines whether the equipped ship is located inside the port area or outside the port area based on the amplitudes of the received signals extracted for each of first divided port determining areas defined as X areas into which a certain port determination area is divided in the azimuthal direction (for example, X=12 areas).

As an example, the inside-or-outside-the-port determination module 41 extracts the received signals for each of the first divided port determining areas from the received signals of the entire search area, and then counts the number of data that has amplitude greater than the predetermined amplitude (Aref) among the received signals extracted for each of the first divided port determining areas. Further, the inside-or-outside-the-port determination module 41 extracts M0 counts (for example, 3) in descending order among the counts (Nsub) acquired for each of the first divided port determining areas, and then calculates the total sum (S) of the extracted M0 counts. The inside-or-outside-the-port determination module 41 determines that the equipped ship is located inside the port area when the total sum (S) is greater than a predetermined value (Sref), or the equipped ship is located outside the port area when less than the predetermined value (Sref). The magnitude of amplitudes of the received signals depends on the transmission pulse width and, thus, the values of Aref and Sref may be changed according to the transmission pulse width. Further, if the sampling rate of the received signals differs according to the detection range, the values of Aref and Sref may be changed according to the sampling rate of the received signals.

As another example, that the equipped ship is located inside the port area or outside the port area may be determined based on similarity of the frequency-of-appearance distributions of amplitudes of adjacent first divided port determining areas as a variable. For example, the inside-or-outside-the-port determination module 41 generates the frequency-of-appearance distributions of amplitudes as a variable for the received signals of a first divided port determining area in which the above-described count (Nsub) takes the largest value, and the received signals of an adjacent first divided port determining area. Here, such frequency-of-appearance distributions are represented by h1[j] and h2[j] ($0 \leq j \leq J-1$), respectively. Here, "j" represents a class of the frequency-of-appearance distribution, and "J" represents the number of classes. The inside-or-outside-the-port determination module 41 calculates an index $\rho$ of the similarity defined by Equation 2 based on these data arrays.

$$\rho = \frac{\sum_{j=0}^{J-1} h1[j] \cdot h2[j]}{\sqrt{\sum_{j=0}^{J-1} h1[j] \cdot h1[j]} \cdot \sqrt{\sum_{j=0}^{J-1} h2[j] \cdot h2[j]}} \quad (2)$$

The inside-or-outside-the-port determination module 41 determines that the equipped ship is located outside the port area when the index ρ is greater than a predetermined value (ρref), or determines that the equipped ship is located inside the port area when less than the predetermined value (ρref).

Thus, the inside-or-outside-the-port determination module 41 can perform a determination process that reflects a condition of a radar-search area for each azimuthal direction by determining that the equipped ship is located inside the port area or outside the port area based on the amplitude information obtained for each azimuthal direction.

[2. Determination Scheme Using Map Information]

Alternatively, the determination that the equipped ship is located inside the port area or outside the port area may also be performed using map information, instead of using the amplitudes of the received signals. More specifically, the inside-or-outside-the-port determination module 41 stores latitudes and longitudes of port areas in advance, and determines that the equipped ship is located inside the port area or outside the port area based on the latitudes and longitudes of the equipped ship location obtained from a positioning devices, such as using GPS.

Figure 15:
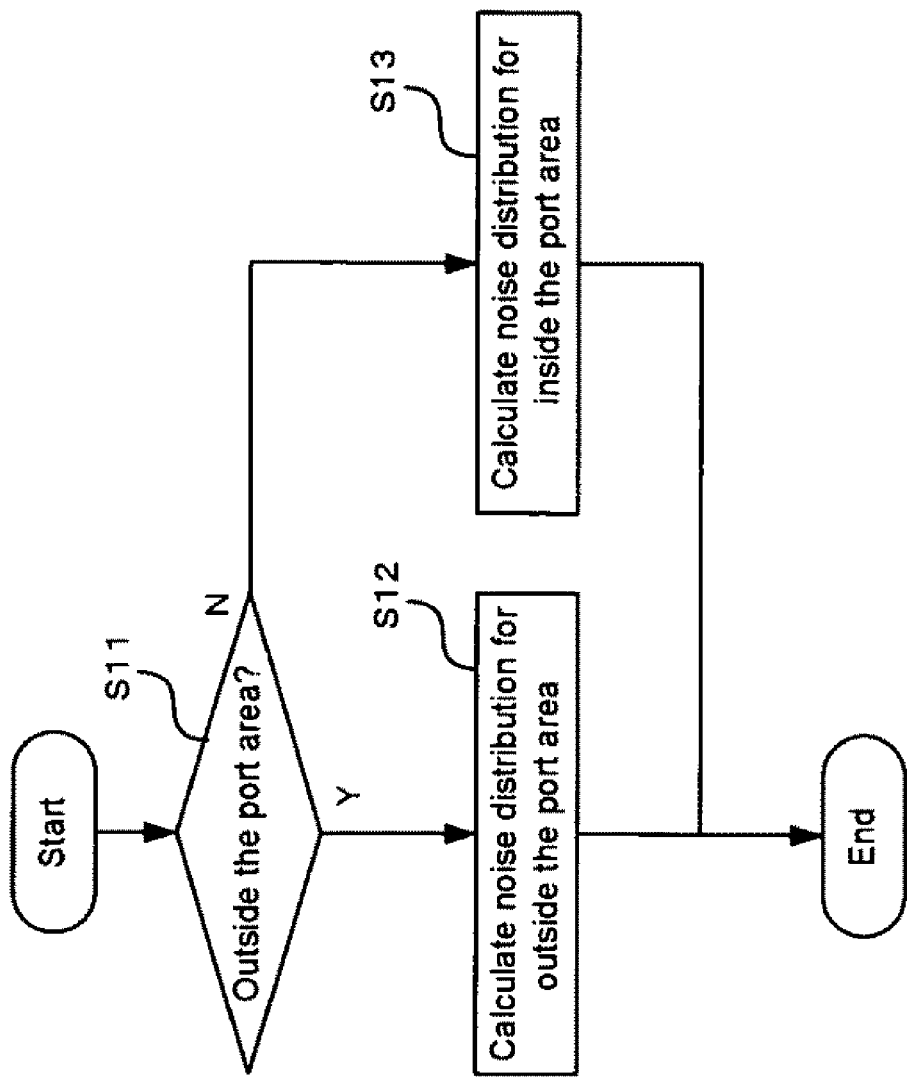
FIG. 15 is a flowchart illustrating a process by noises-level distribution generation module according to the invention.

Next, a distribution generating process of the noise level by the noise-level-distribution generation module 44 according to this embodiment will be explained referring to FIG. 15. FIG. 15 is a flowchart illustrating the process of the noise-level-distribution generation module 44.

At S11, the noise-level-distribution generation module 44, first, acquires a determination result that the equipped ship is located outside the port area or inside the port area from the inside-or-outside-the-port determination module 41. At S12, if the determination result by the inside-or-outside-the-port determination module 41 is outside the port area, the noise-level-distribution generation module 44 then generates a noise-level distribution to be used for outside the port area by the first noise-level-distribution generation module 42. Alternatively, at S13, if the determination result by the inside-or-outside-the-port determination module 41 is inside the port area, the second noise-level-distribution generation module 43 then generates a noise-level distribution to be used for inside the port area.

Next, the generation scheme of the noise-level distribution to be used for outside the port area will be explained in more detail. For the noise-level distribution to be used for outside the port area, a frequency-of-appearance distribution of amplitudes as a variable for the received signals from a predetermined area is generated, and the noise-level distributions, such as white noise and clutters, are generated based on the frequency-of-appearance distribution. More specifically, here, the generation scheme of the noise-level distribution to be used with the radar device of Embodiment 1 may be used.

However, the generation scheme of the noise-level distribution to be used outside the port area explained herein is merely an example. Thus, any other generation algorithm of the noise-level distribution capable of removing noises, such as white noise and clutters, in the middle of ocean at the optimum level may be used, without any limitation.

On the other hand, in order to assist a safe cruise inside the port area, the radar device may be desirable to clearly display artificial structures which exist in proximity to the equipped ship, such as quays, breakwaters, piers, and other ships. However, the noise level obtained with the generation algorithm of the noise-level distribution to be used for outside the port area may not necessarily be in agreement with the values necessary for clearly displaying those artificial structures.

For this reason, the radar device according to this embodiment selectively changes the generation algorithm of the noise-level distribution based on the determination result of the inside-or-outside-the-port determination module 41. If the equipped ship is located outside the port area, the first noise-level-distribution generation module 42 generates a noise-level distribution to be used for outside the port area. Alternatively, if the equipped ship is located inside the port area, the second noise-level-distribution generation module 43 generates a noise-level distribution to be used for inside the port area.

Figure 16:
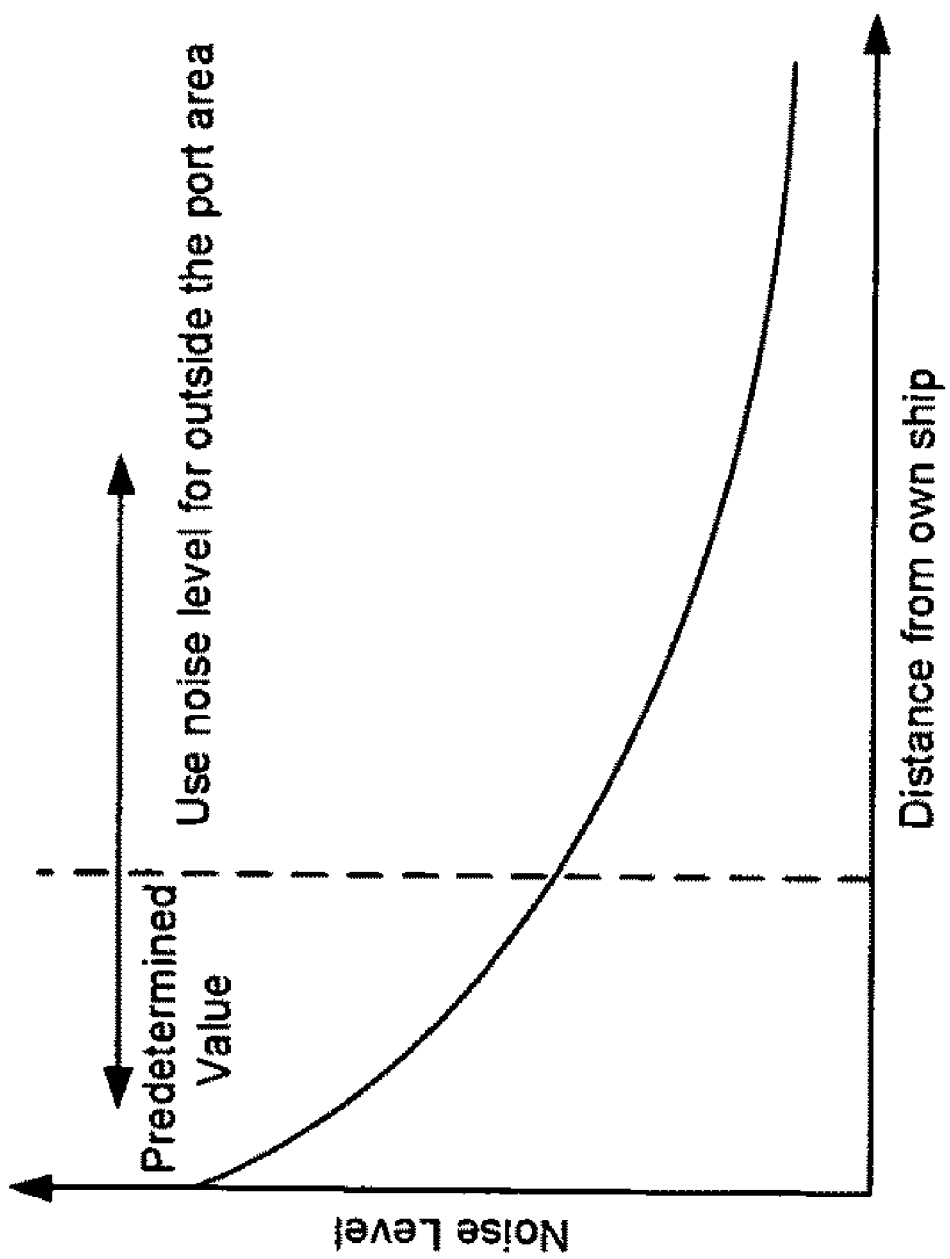
FIG. 16 is a view showing an example of the noise-level distribution for inside the port area.

Below, the generation scheme of the noise-level distribution to be used for inside the port area will be explained in more detail referring to FIG. 16. For the noise-level distribution to be used for inside the port area, as shown in FIG. 16, the noise-level distribution generated by the first noise-level-distribution generation module 42 is used as it is if the corresponding area is beyond a predetermined distance from the equipped ship (for example, 0.5 NM), or otherwise, a noise level that is predefined according to the distance from the equipped ship may be used as the noise-level distribution for the area concerned.

That is, the second noise-level-distribution generation module 43 outputs a noise-level distribution for an area in proximity to the equipped ship suitable for clearly displaying the artificial structures, or otherwise, outputs a noise-level distribution to be used for outside the port area for an area distant from the equipped ship beyond the predetermined distance. In order to prevent the noise level from discontinuously varying in the distance direction, it may be preferable to perform a process to continuously change the noise levels in the boundary portion of these two areas.

The generation scheme of the noise-level distribution to be used for the port area explained herein is merely an example. For example, a noise level predefined according to the distance from the equipped ship may also be used as a noise-level distribution for the entire radar-search area. The noise level may be, but not limited to, any other level as long as artificial structures existing in proximity to the equipped ship can be clearly displayed.

As described above, in this embodiment, the equipped ship location either inside the port area or outside the port area is determined, and the generation algorithm of the noise-level distribution is changed based on the determination result. Therefore, a radar image of the optimum sensitivity can be always obtained without performing operations, such as a change of settings, sensitivity adjustment even the equipped ship is located in the middle of ocean or in a port.

As described above, the generation algorithm of the noise-level distribution is changed depending on the equipped ship being located inside the port area or outside the port area in this embodiment. However, the equipped ship may be determined either inside the port area or outside the port area for each azimuthal direction based on a condition of surrounding ocean area of the equipped ship, and the generation algorithm of the noise-level distribution may then be changed for each azimuthal direction.

More specifically, the inside-or-outside-the-port determination module 41 determines of inside the port area or outside the port area for each of the second divided port determining areas defined as one of a plurality of areas into which the radar-search area is divided in the azimuthal direction. The noise-level-distribution generation module 44 creates either a noise-level distribution for outside the port area or a noise-level distribution for inside the port area for each of the second divided port determining areas based on the determination result of the inside-or-outside-the-port determination module 41. Thus, for example, a noise-level distribution for inside the port area which is suitable for inside the port area may be used for forward of the equipped ship at the time of entry into the port, and a noise-level distribution for outside the port area which is suitable for outside the port area rearward of the equipped ship. In order to avoid the discontinuity of sensitivity caused when the process is switched from one azimuthal direction to another, a process, such as smoothing, may be performed to the noise level so that sensitivity continuously varies in the azimuthal direction on the boundary of the second divided port determining areas.

Embodiment 4

Figure 17:
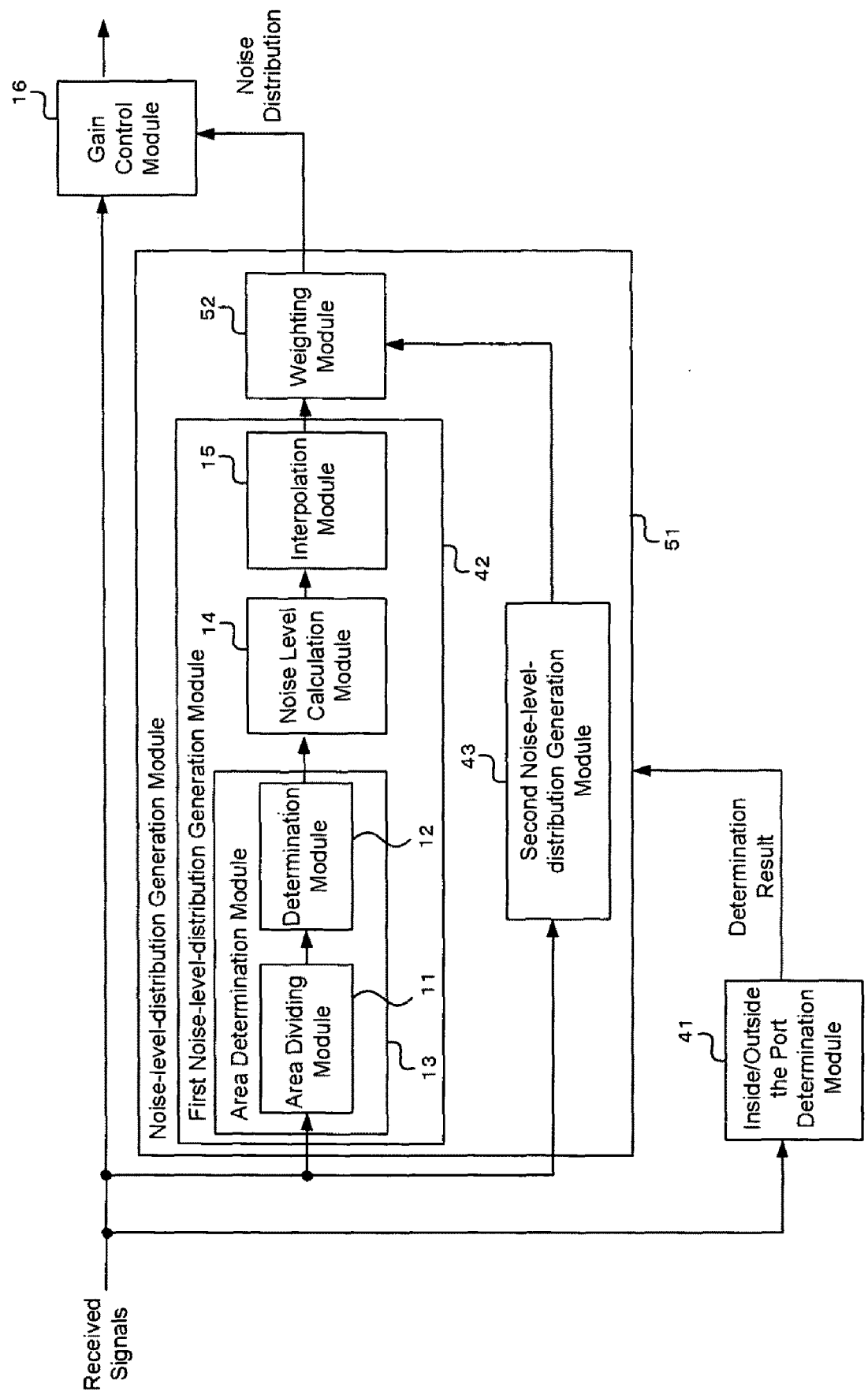
FIG. 17 is a block diagram showing a configuration of a radar device according to Embodiment 4 of the invention.

Next, a radar device according to another embodiment will be explained referring to FIG. 17, which is a block diagram showing a configuration of the radar device. The radar device according to this embodiment is different from the radar device according to the previous embodiment (Embodiment 3) in the following point.

In the radar device of this embodiment, immediately after the determination result by the inside-or-outside-the-port determination module 41 changes from inside the port area to outside the port area, or immediately after it changes from outside the port area to inside the port area, a weighting module 52 of a noise-level-distribution generation module 51 generates both a noise-level distribution for outside the port area and a noise-level distribution for inside the port area, and then outputs a weighted average of both. Components other than a noise-level-distribution generation module 51 and a weighting module 52 are similar to that of the previous embodiment and, thus, explanation thereof will be omitted herein.

Figure 18:
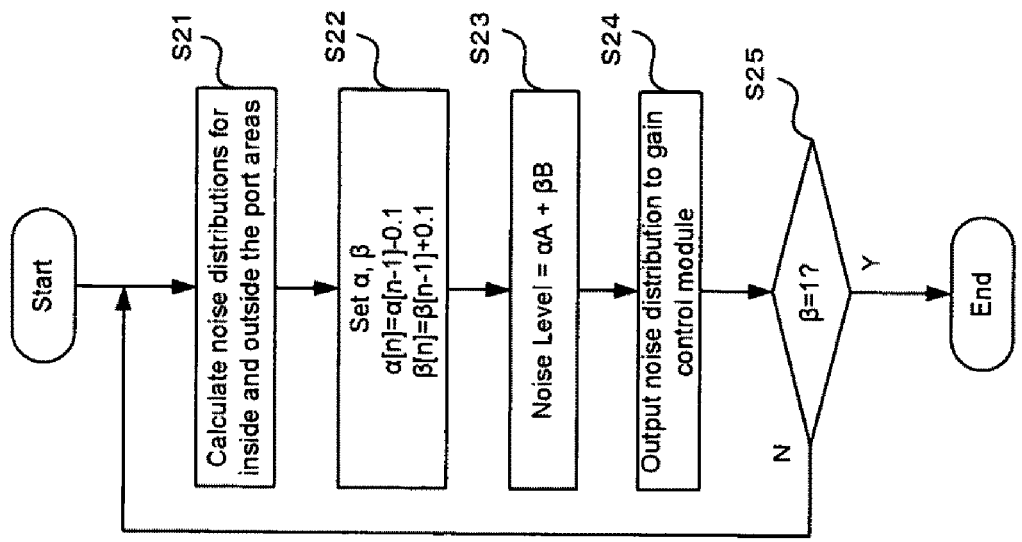
FIG. 18 is a flowchart illustrating a process when the determination result by the inside-or-outside-the-port determination module of the radar device according to Embodiment 4 of the invention changes.

FIG. 18 is a flowchart illustrating a process of the noise-level-distribution generation module 51. This process is performed when the determination result by the inside-or-outside-the-port determination module 41 changes from inside the port area to outside the port area, or when it changes from outside the port area to inside the port area.

At S21, when the determination result by the inside-or-outside-the-port determination module 41 changes from inside the port area to outside the port area, or when it changes from outside the port area to inside the port area, the noise-level-distribution generation module 51 generates both a noise-level distribution for outside the port area and a noise-level distribution for inside the port area.

Next, at S22, the weighting module 52 then sets weights $\alpha$ and $\beta$ of the noise level before and after the change, respectively. Here, $\alpha$ is a coefficient by which the determination result before the change is multiplied, and $\beta$ is a coefficient by which the determination result after the change is multiplied. For example, when changing the weights by 0.1 as shown in Table 1, assuming that $\alpha$ used previously is $\alpha[n-1]$, and $\alpha$ used presently is $\alpha[n]$, the weight $\alpha$ is set to $\alpha[n]=\alpha[n-1]-0.1$. In addition, assuming that $\beta$ used previously is $\beta[n-1]$, and $\beta$ used presently is $\beta[n]$, the weight $\beta$ is set to $\beta[n]=\beta[n-1]+0.1$. Here, the initial values of $\alpha$ and $\beta$ are $\alpha=1$ and $\beta=0$, respectively.

TABLE 1

| Number of antenna rotation | A | B |
|---|---|---|
| 1 | 0.9 | 0.1 |
| 2 | 0.8 | 0.2 |
| 3 | 0.7 | 0.3 |
| 4 | 0.6 | 0.4 |
| 5 | 0.5 | 0.5 |
| 6 | 0.4 | 0.6 |
| 7 | 0.3 | 0.7 |
| 8 | 0.2 | 0.8 |
| 9 | 0.1 | 0.9 |
| 10 | 0 | 1 |

At S23, after the setting of $\alpha$ and $\beta$, the weighting module 52 calculates $\alpha A+\beta B$ to calculate a weighted average of the noise levels at a search location of the same direction and the same distance, and then, at S24, generates a noise-level distribution for the corresponding search area based on the calculated noise levels to output it to the gain control module 16. "A" is a noise level corresponding to the determination result before the change, and "B" is a noise level corresponding to the determination result after the change. For example, when the determination result by the inside-or-outside-the-port determination module 41 changes from inside the port area to outside the port area, a noise level used for inside the port area is "A" and a noise level used for outside the port area is "B."

At S25, the noise-level-distribution generation module 51 then determines whether the state is completely shifted from the state before the change to the state after the change, that is, determines whether a set value of $\alpha$ is "0" and a set value of $\beta$ is "1." If $\alpha=0$ and $\beta=1$, only a noise-level distribution after the shift will be generated to be outputted. On the other hand, if $\alpha \neq 0$ and $\beta \neq 1$, the processes from Steps S21-S23 will be repeatedly performed until $\alpha=0$ and $\beta=1$ can be obtained. As such, through shift processes for ten rotations, a noise-level distribution before the change gradually shifts to a noise-level distribution after the change.

During the processes of Steps S21-S24, if the determination result by the inside-or-outside-the-port determination module 41 changes again, the values of $\alpha$ and $\beta$ may be changed by 0.1 to return it to the state of $\alpha=1$ and $\beta=0$ similar to the processes of Steps S21-25, as described above. Therefore, even if the determination result by the inside-or-outside-the-port determination module 41 changes again, it is possible to prevent the noise level for each search location obtained from the noise-level distribution from changing rapidly.

Alternatively, the following simplified method for the weighting process of Embodiment 2 may be provided.

When the radar device is operated, the noise-level-distribution generation module 51 generates a noise-level distribution for outside the port area or a noise-level distribution for inside the port area based on the determination result by the inside-or-outside-the-port determination module 41, and then outputs it to the gain control module 16, while these operations are repeated. At this point, instead of outputting the generated noise-level distribution as it is, the noise-level-distribution generation module 51 calculates a weighted average of the previous noise level calculated at a search location of the same direction and the same distance, and the calculated present noise level, then generates a noise-level distribution for a search area based on the calculated noise levels, and then outputs it. Assuming that the previously outputted noise level is $TH_{out}[n-1]$ and the presently calculated noise level is $TH[n]$, the presently outputted noise level $TH_{out}[n]$ may be expressed with an equation, $TH_{out}[n]=0.1*TH[n]+$ 0.9*$TH_{out}[n-1]$, for example. Immediately after activation of the radar device, the noise-level distribution for the search area may be generated based on the calculated noise levels, and may then be outputted as it is.

As described above, even when the determination result by the inside-or-outside-the-port determination module 41 changes from inside the port area to outside the port area, or from outside the port area to inside the port area, the outputted result of the noise-level-distribution generation module 51 can be gradually changed. Therefore, it is possible to avoid the discontinuous change in the radar image. Further, even when the inside-or-outside-the-port determination module 41 mistakenly determines for temporarily, a rapid change in the outputted results by the noise-level-distribution generation module 51 can be eased. Therefore, the erroneous determination may be prevented without giving an uncomfortable radar image to a user.

In this embodiment, immediately after the determination result by the inside-or-outside-the-port determination module 41 changes from inside the port area to outside the port area, or immediately after changing from outside the port area to inside the port area, the weighted average of the previously outputted noise level and the presently calculated noise level is calculated, and a noise-level distribution with the calculated average is generated as a noise level to be presently outputted. However, in this embodiment, nevertheless whether the determination result by the inside-or-outside-the-port determination module changes, the weighted average of the previously outputted noise level and the presently calculated noise level may always be calculated, and a noise-level distribution for the search area may always be generated based on the calculated noise levels. Therefore, even if the noise-level-distribution generation module 51 calculates an abnormal value temporarily due to a certain cause, it may be possible to generate the optimum noise-level distribution with less influence.

Embodiment 5

Next, another radar device will be explained. The radar device of this embodiment is different from the radar device of Embodiment 3 in that the determination result by the inside-or-outside-the-port determination module 41 is informed to a user. Similar components to the radar device of Embodiment 3 are assigned with similar reference numerals and, thus, explanation thereof will be omitted herein.

Figure 19:
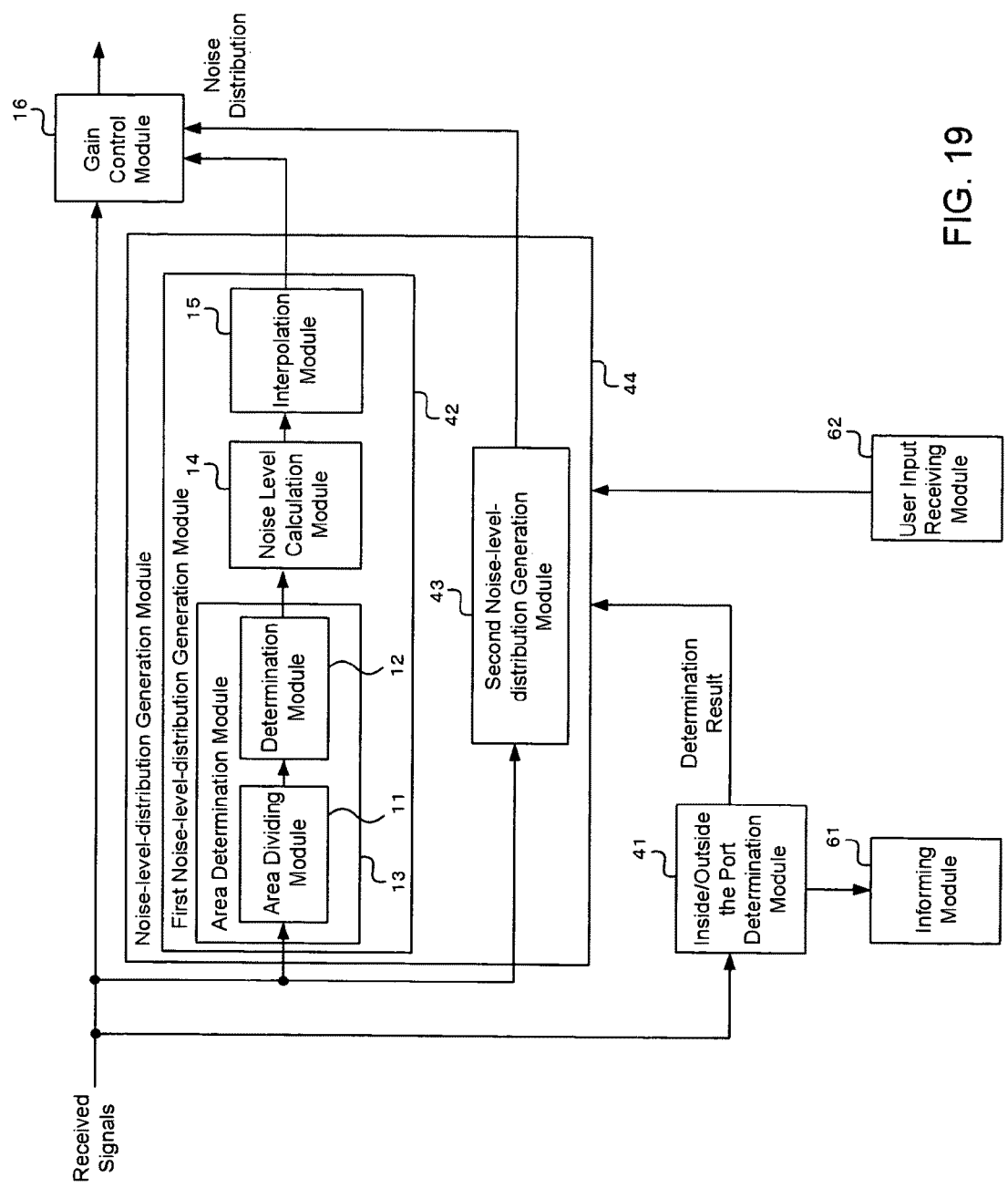
FIG. 19 is a block diagram showing a configuration of a radar device according to Embodiment 5 of the invention.

FIG. 19 is a block diagram showing a configuration of the radar device of this embodiment. An informing module 61 informs the determination result of the inside-or-outside-the-port determination module 41 to the user. The informing method to the user may be any other method, such as displaying the determination result on a display screen, or informing with sounds or vibrations.

A user-input receiving module 52 may be an input device that receives user's inputs, such as a mouse. The user-input receiving module 52 receives an execution instruction of any one of processes [1]-[3] shown below, and then outputs the received instruction to the noise-level-distribution generation module 44.

[1] Generate a noise-level distribution for outside the port area or inside the port area according to the determination result of the inside-or-outside-the-port determination module 41.

[2] Generate a noise-level distribution for outside the port area without depending on the determination result of the inside-or-outside-the-port determination module 41.

[3] Generate a noise-level distribution for inside the port area without depending on the determination result of the inside-or-outside-the-port determination module 41.

The noise-level-distribution generation module 44 performs one of the processes [1]-[3] shown above according to the instruction received by the user-input receiving module 22. Thus, the user may change the process while viewing a radar image. For example, the user selects the process [2] when he wants to remove clutters of sea-surface reflections inside the port area. Alternatively, when the inside-or-outside-the-port determination module 41 produces an erroneous determination, the user selects the process [2] or [3] to adjust so that an appropriate noise-level distribution is generated.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims are understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

In the following claims, reference numerals corresponding to those indicated in the above-described embodiments are added to assist understanding of the claims; however, they are only shown for this purposes and are not to limit the scope of the present invention in any way.

What is claimed is:

1. A radar device, comprising:
an area determination module for performing a determination of whether each predefined divided area of a radar-search area is a noise superior area or a target-echo superior area;
a noise-level calculation module for calculating a noise level for a divided area that was determined to be a noise superior area by the area determination module based on received signals from the divided area that was determined to be a noise superior area, wherein the noise-level calculation module is inhibited from calculating the noise level for a divided area that was determined to be a target-echo area by the area determination module; and
an interpolation module for interpolating or extrapolating, from the calculated noise level for the divided area that is determined as the noise superior area, a noise level for a divided area that was determined to be a target-echo superior area by the area determination module.

2. The radar device of claim 1, wherein the area determination module performs the determination of the noise superior area or the target-echo superior area for each divided area based on a frequency-of-appearance distribution of amplitudes of the received signals as a variable for the divided area.

3. The radar device of claim 2, wherein the area determination module performs the determination of the noise superior area or the target-echo superior area by evaluating symmetry of the frequency-of-appearance distribution.

4. The radar device of claim 2, wherein the area determination module performs the determination of the noise superior area or the target-echo superior area based on the frequency of appearance greater than a predetermined value.

5. The radar device of claim 2, wherein the area determination module performs the determination of the noise superior area or the target-echo superior area based on a signal amplitude corresponding to the maximum frequency of appearance, and a signal amplitude corresponding to N % frequency of appearance of the maximum frequency of appearance (0<N<100).

6. The radar device of claim 2, wherein the area determination module performs the determination of the noise superior area or the target-echo superior area based on a signal amplitude corresponding to N % frequency of appearance of the maximum frequency of appearance (0<N<100), and a signal amplitude corresponding to M % frequency of appearance of the maximum frequency of appearance (0<M<100, M≠N).

7. The radar device of claim 1, wherein the interpolation module linearly interpolates or extrapolates the noise level for the divided area that is determined as the noise superior area in an azimuthal direction or a distance direction to obtain a noise-level distribution for the radar-search area.

8. The radar device of claim 7, further comprising a gain control module for comparing amplitudes of the received signals acquired for the radar-search area with a predetermined threshold to output received signals with the amplitudes greater than the predetermined threshold;
wherein the gain control module determines the predetermined threshold based on the noise-level distribution for the radar-search area generated by the interpolation module to perform a gain control of the received signals.

9. The radar device of claim 8, further comprising a correlation module for performing a correlation process of a present radar image and a past radar image;
wherein the gain control module changes the predetermined threshold for a comparison with the amplitudes of the received signals between a case where the correlation process is performed by the correlation module and a case where it is not performed.

10. The radar device of claim 7, further comprising a correlation module for performing a correlation process of a present radar image and a past radar image;
wherein the correlation module determines weights of the present radar image and the past radar image based on the noise-level distribution generated by the interpolation module, and performs the correlation process of the present radar image and the past radar image based on the determined weights.

11. The radar device of claim 7, wherein the radar device is equipped on a marine vessel.

12. The radar device of claim 11, further comprising:
an inside-or-outside-the-port determination module for determining whether an equipped ship is located inside a port area or outside the port area; and
a noise-level-distribution generation module including a first noise-level-distribution generation module and a second noise-level-distribution generation module;
wherein the first noise-level-distribution generation module having the area determination module, the noise-level calculation module, and the interpolation module;
wherein the second noise-level-distribution generation module generates a noise-level distribution for the radar-search area with a different algorithm from an algorithm used by the first noise-level-distribution generation module; and
wherein the noise-level-distribution generation module outputs a noise-level distribution for outside the port area generated by the first noise-level-distribution generation module when the equipped ship is located outside the port area, and outputs a noise-level distribution for inside the port area generated by the second noise-level-distribution generation module when the equipped ship is located inside the port area.

13. The radar device of claim 12, wherein the inside-or-outside-the-port determination module determines whether the equipped ship is located inside the port area or outside the pod area based on the amplitudes of the received signals in a port determining area defined as an area of a predetermined distance range from the equipped ship.

14. The radar device of claim 13, wherein the inside-or-outside-the-port determination module counts the number of data (Nnum) that has amplitudes greater than a predetermined amplitude (Aref) based on the received signals of the port determining area, and the inside-or-outside-the-port determination module determines that the equipped ship is located inside the port area when the count (Nnum) is greater than a predetermined value (Nref), and determines that the equipped ship is located outside the port area when less than the predetermined value (Nref).

15. The radar device of claim 13, wherein the inside-or-outside-the-port determination module determines that the equipped ship is located inside the port area or outside the port area based on amplitudes of the received signals extracted for each of first divided port determining areas defined as one of a plurality of areas into which the port determining area is divided in the azimuthal direction.

16. The radar device of claim 12, wherein the inside-or-outside-the-port determination module determines whether the equipped ship is located inside the port area or outside the port area based on equipped ship location information and map information.

17. The radar device of claim 12, wherein the inside-or-outside-the-port determination module performs the determination of inside the port area or outside the port area for each of the second divided port determining areas defined as one of a plurality of areas into which the radar-search area is divided in the azimuthal direction; and
wherein the noise-level-distribution generation module selects a noise-level distribution to output for each of the second divided port determining areas.

18. The radar device of claim 12, wherein, immediately after the determination result by the inside-or-outside-the-port determination module changes from inside the port area to outside the port area, or immediately after changing from outside the port area to inside the port area, the noise-level-distribution generation module causes the first noise-level-distribution generation module and the second noise-level-distribution generation module to generate both a noise-level distribution for outside the port area and a noise-level distribution for inside the port area, respectively, and the noise-level-distribution generation module outputs a weighted average of both as the noise-level distribution to be generated.

19. The radar device of claim 12, wherein the noise-level-distribution generation module outputs a weighted average of a previously outputted noise level and a presently calculated noise level as the noise-level distribution to presently output.

20. The radar device of claim 12, further comprising an informing module for informing a user whether the equipped ship is located inside the port area or outside the port area based on the determination result of the inside-or-outside-the-port determination module.

* * * * *